US011658936B2

(12) United States Patent
Strauss et al.

(10) Patent No.: US 11,658,936 B2
(45) Date of Patent: *May 23, 2023

(54) RESIZING VIRTUAL PRIVATE NETWORKS IN PROVIDER NETWORK ENVIRONMENTS

(71) Applicant: Amazon Technologies, Inc., Seattle, WA (US)

(72) Inventors: Benjamin David Strauss, Bethesda, MD (US); John D. Bomkamp, Seattle, WA (US); Steven Gerard Betten, Herndon, VA (US); Aniket Deepak Divecha, Seattle, WA (US); Mingxue Zhao, Seattle, WA (US); George Wickersham, Snoqualmie, WA (US); Mahmoud Ali Abuelela, Herndon, VA (US); Shane Ashley Hall, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/459,946

(22) Filed: Aug. 27, 2021

(65) Prior Publication Data

US 2022/0124066 A1 Apr. 21, 2022

Related U.S. Application Data

(63) Continuation of application No. 16/698,469, filed on Nov. 27, 2019, now Pat. No. 11,108,732, which is a
(Continued)

(51) Int. Cl.
*G06F 15/16* (2006.01)
*H04L 61/50* (2022.01)
(Continued)

(52) U.S. Cl.
CPC .......... *H04L 61/50* (2022.05); *H04L 61/5007* (2022.05); *G06F 9/5077* (2013.01); *H04L 69/161* (2013.01)

(58) Field of Classification Search
CPC ... H04L 61/50; H04L 61/5007; H04L 69/161; G06F 9/5077
(Continued)

(56) References Cited

U.S. PATENT DOCUMENTS 6,581,108 B1 6/2003 Denison et al.
6,662,221 B1 12/2003 Gonda et al.
(Continued)

FOREIGN PATENT DOCUMENTS

CN 102598591 7/2012

OTHER PUBLICATIONS

U.S. Appl. No. 15/179,739, filed Jun. 10, 2016, Eric W, Schultze.
(Continued)

*Primary Examiner* — Moustafa M Meky
(74) *Attorney, Agent, or Firm* — Robert C. Kowert; Kowert, Hood, Munyon, Rankin & Goetzel, P.C.

(57) ABSTRACT

Virtual networks may be launched in a provider network with an initial IP address space (e.g., an IPv4 CIDR block). Methods are described that allow additional IP address spaces to be added to a virtual network. A new IP address space for a virtual network may be specified via an API. The specified space may be checked to insure that it does not overlap with IP spaces that are associated with the virtual network. If there are no overlaps, the space is added to the network, for example by adding the space to the network's route tables.

20 Claims, 26 Drawing Sheets

Related U.S. Application Data continuation of application No. 15/632,258, filed on Jun. 23, 2017, now Pat. No. 10,498,693.

(51) Int. Cl.
*H04L 61/5007* (2022.01)
*G06F 9/50* (2006.01)
*H04L 69/16* (2022.01)

(58) Field of Classification Search
USPC .......................................................... 709/245
See application file for complete search history.

(56) References Cited

U.S. PATENT DOCUMENTS

| | | |
|---|---|---|
| 7,606,895 B1 | 10/2009 | Dini et al. |
| 7,814,541 B1 | 10/2010 | Manvi |
| 7,974,201 B1 | 7/2011 | Daruwalla et al. |
| 8,041,761 B1 * | 10/2011 | Banga ................ G06Q 20/382 |
| | | 705/52 |
| 8,504,688 B2 | 8/2013 | Kullos |
| 8,510,420 B1 | 8/2013 | Brandwine et al. |
| 8,996,691 B1 | 3/2015 | Stickle et al. |
| 9,032,070 B1 | 5/2015 | Stickle et al. |
| 9,166,992 B1 | 10/2015 | Stickle et al. |
| 9,203,741 B1 | 12/2015 | Martini et al. |
| 9,509,524 B2 | 11/2016 | Lewis |
| 9,787,546 B2 | 10/2017 | Bardgett et al. |
| 10,498,693 B1 * | 12/2019 | Strauss ............... H04L 61/2592 |
| 10,541,966 B1 * | 1/2020 | Wei ....................... H04L 45/586 |
| 11,153,262 B1 * | 10/2021 | Wei ..................... H04L 61/2521 |
| 2003/0110252 A1 | 6/2003 | Yang-Huffman |
| 2008/0225875 A1 | 9/2008 | Wray et al. |
| 2010/0020685 A1 | 1/2010 | Short et al. |
| 2010/0302973 A1 | 12/2010 | Lange et al. |
| 2011/0283017 A1 | 11/2011 | Alkhatib et al. |
| 2012/0084146 A1 | 4/2012 | Zwicky |
| 2015/0043378 A1 | 2/2015 | Bardgett et al. |
| 2015/0358205 A1 | 12/2015 | Brophy |
| 2016/0359812 A1 | 12/2016 | Maher |
| 2017/0250949 A1 * | 8/2017 | McKinney .......... H04L 61/2525 |
| 2017/0346787 A1 | 11/2017 | Menon et al. |

OTHER PUBLICATIONS

U.S. Appl. No. 13/833,945, filed Mar. 15, 2013, Ian Roger Searte.
U.S. Appl. No. 15/728,277, filed Oct. 9, 2017, Kevin Christopher Miller.
U.S. Appl. No. 14/548,196, filed Nov. 19, 2014, Edward Max Schaefer.
U.S. Appl. No. 15/823,185, filed Nov. 27, 2017, Kevin Christopher Miller.
U.S. Appl. No. 14/658,965, filed Mar. 16, 2015, Weili Zhong Mcclenahan.
U.S. Appl. No. 14/736,165, filed Jun. 10, 2015, Colm Maccarthaigh.
U.S. Appl. No. 16/029,468, filed Jul. 6, 2018, Kyle Tailor Akers.
U.S. Appl. No. 14/853,646, filed Sep. 14, 2015, Po-Chun Chen.
U.S. Appl. No. 16/056,078, filed Aug. 6, 2018, Unknown.
U.S. Appl. No. 15/439,751, filed Feb. 22, 2017, Mihir Sadruddin Surani.
U.S. Appl. No. 15/435,138, filed Feb. 16, 2017, Daniel Todd Cohn.
U.S. Appl. No. 15/702,589, filed Sep. 12, 2017, Kevin Christopher Miller.
U.S. Appl. No. 14/822,704, filed Aug. 10, 2015, Daniel T. Cohn.
U.S. Appl. No. 14/853,608, filed Sep. 14, 2015, Eric Jason Brandwine.
U.S. Appl. No. 13/829,721, filed Mar. 14, 2013, Eric Jason Brandwine.
U.S. Appl. No. 15/382,403, filed Dec. 16, 2016, Daniel Todd Cohn.
U.S. Appl. No. 15/011,302, filed Jan. 29, 2016, Eric Jason Brandwine.
U.S. Appl. No. 15/996,371, filed Jun. 1, 2018, Eric Jason Brandwine.
U.S. Appl. No. 15/663,592, filed Jul. 28, 2017, Kevin Christopher Miller.
U.S. Appl. No. 14/067,756, filed Oct. 30, 2013, Daniel T. Cohn.
U.S. Appl. No. 15/061,851, filed Mar. 4, 2016, Eric Jason Brandwine.
U.S. Appl. No. 15/154,818, filed May 13, 2016, Eric Jason Brandwine.

* cited by examiner

1700

```
<PN name>
<PN identifier>
<Other PN information>
10.0.0.0/16    <primary CIDR block>    <status>    <CIDR block ID>
11.0.0.0/16    <added CIDR block>      <status>    <CIDR block ID>
12.0.0.0/16    <added CIDR block>      <status>    <CIDR block ID>
   ⋮
```

*FIG. 9*

RESIZING VIRTUAL PRIVATE NETWORKS IN PROVIDER NETWORK ENVIRONMENTS

This application is a continuation of U.S. patent application Ser. No. 16/698,469, filed Nov. 27, 2019, which is a continuation of U.S. patent application Ser. No. 15/632,258, filed Jun. 23, 2017, now U.S. Pat. No. 10,498,693, which are hereby incorporated by reference herein in their entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF THE DRAWINGS

FIG. 9 illustrates an example descriptor record for a private network that includes descriptions of the private network's CIDR blocks, according to some embodiments.

Figure 1A:
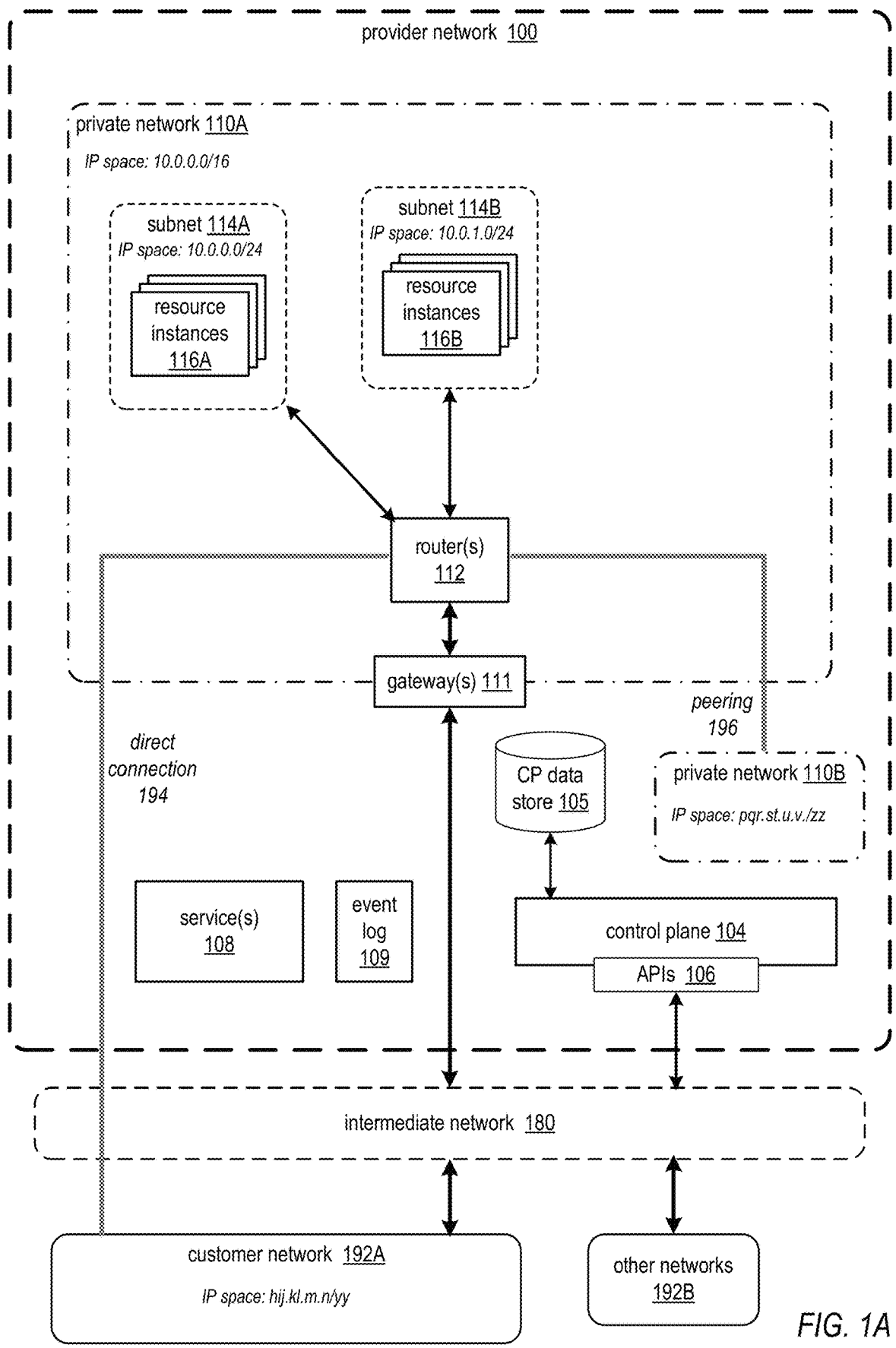
FIGS. 1A through 1G graphically illustrate resizing private networks in provider network environments, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of methods and apparatus for resizing virtual private networks in provider network environments are described. Embodiments of methods and apparatus for resizing virtual private networks may, for example, be implemented in the context of a provider network that provides virtual resources such as computing resources executing as virtual machines (VMs), as well as other virtual resources such as virtual storage, to customers via an intermediate network such as the Internet. The provider network may include a network substrate and a control plane implemented by one or more data centers, and may host one or more virtual computing services and application programming interfaces (APIs) that allow customers to establish, provision, and manage their virtualized resources in virtual private networks (referred to herein as private networks) on the provider network.

In virtual network environments that allow customers to provision virtual private networks, the customers' virtual private network(s) are discrete, routed IP containers that are hosted on the provider network and that may be viewed as virtual analogs to physical data centers. A virtual private network is launched in a provider network with a customer-specified IP address space (e.g., an Internet Protocol Version 4 (IPv4) Classless Inter-Domain Routing (CIDR) block, e.g. 172.31.0.0/20 or 10.0.0.0/16, or alternatively an Internet Protocol Version 6 (IPv6) CIDR block, e.g. 2600:1f16:67d:2000::/56), which may be referred to as a local or private (to the virtual private network) IP address space. In some embodiments, virtual private networks may be required to use IP address ranges within the private IP address spaces as defined by RFC 1918 for IPv4 as their local IP address space:

10.0.0.0-10.255.255.255 (10/8 prefix)
172.16.0.0-172.31.255.255 (172.16/12 prefix)
192.168.0.0-192.168.255.255 (192.168/16 prefix)

In some embodiments, virtual private networks may also be allowed to use IP address ranges within the private IP address space as defined by RFC 4193 for IPv6 (fc00::/7) as their local IP address space. In some embodiments, virtual private networks may also be allowed to use public IPv4 or IPv6 address ranges in their virtual private networks as their local IP address space.

In some embodiments, a customer may also specify one or more subnets in their virtual private network's IP address space. In some embodiments, a subnet can be specified as the same CIDR block as the virtual private network (providing a single subnet in the virtual private network), or alternatively one or more CIDR blocks that are subsets of the CIDR block of the virtual private network can be specified to provide one or more subnets in the virtual private network. As a non-limiting example, if a customer creates a virtual private network with CIDR block 10.0.0.0/24, it supports 256 IP addresses. The customer may, for example, break this CIDR block into two subnets, each supporting 128 IP addresses. One subnet uses CIDR block 10.0.0.0/25 (for addresses 10.0.0.0-10.0.0.127) and the other uses CIDR block 10.0.0.128/25 (for addresses 10.0.0.128-10.0.0.255).

Conventionally, provider networks do not allow customers to add additional IP address spaces to their virtual private networks. Thus, customers have to predict the IP address space requirements for their virtual private networks when creating the networks. However, over time, resource usage in a virtual private network may outgrow the initial IP address space. This may cause problems for customers who underestimate the growth potential for their virtual private networks, and who later find that resource usage in their virtual private networks outgrow the initially specified IP address spaces. A customer may allocate a much larger initial IP address space for a virtual private network than the network may ever need; however, customers may have many virtual private networks on the provider network, as well as external networks, that may be interconnected and that thus may have to share IP address space and avoid overlapping IP address ranges, and thus customers may need to use their IP address space efficiently.

Embodiments of virtual private network resizing methods and apparatus are described that allow customers to add additional IP address spaces (e.g., additional CIDR blocks, for example 10.1.0.0./16, 11.0.0.0/20, etc.) to their existing virtual private networks (e.g., created with an initial CIDR block 10.0.0.0/24). In some embodiments, a customer may specify an IP address space to be added to their virtual private network via an API to a control plane process of the provider network. In some embodiments, the control plane may check the specified IP address space to insure that the space does not overlap with IP address spaces that are associated with the virtual private networks (e.g., other IP address space(s) of the virtual private network, the IP address space(s) of networks external to the provider network that are connected to the virtual private network via a direct connection, the IP address space(s) of other virtual private networks that are connected to the virtual private network through a virtual peering connection over the provider network substrate, existing routes in the virtual private network, etc.). If there are no conflicts, the control plane configures the new IP address space in the virtual private network, for example by adding the IP address space to the virtual private network's route table(s) and to descriptive information that is maintained for the virtual private network. In some embodiments, provider network services that need to know the virtual private network's address space(s) may be informed, for example by writing an event to an event log that is consumed by the services. In some embodiments, an API may also be provided that allows customers to view and manage the IP address spaces in their virtual private networks, for example to add new CIDR blocks and delete existing CIDR blocks from their virtual private networks. In some embodiments, customers may not be allowed to delete a virtual private network's initial (also referred to as primary) CIDR block. However, in some embodiments, the initial CIDR block may be deleted as long as there is at least one added CIDR block remaining in the virtual private network.

In some embodiments, customers may be allowed to add IP address ranges within the private IP address spaces as defined by RFC 1918 for IPv4 to their virtual private networks. In some embodiments, customers may be allowed to add IP address ranges within the private IP address space as defined by RFC 4193 for IPv6 (fc00::/7) to their virtual private networks. In some embodiments, customers may also be allowed to add public IPv4 or IPv6 address ranges to their virtual private networks.

In some embodiments, the provider network may impose restrictions on the IP address ranges that a customer is allowed to add to add to their virtual private network. For example, customers may not be allowed to add CIDR blocks that overlap with the primary CIDR block or any previously added CIDR blocks, or CIDR blocks that overlap with other IP address spaces that are associated with the virtual private network (e.g., the IP address space(s) of networks external to the provider network that are connected to the virtual private network via a direct connection, the IP address space(s) of other virtual private networks that are connected to the virtual private network through a virtual peering connection over the provider network substrate) or that overlap existing routes in route tables in the virtual private network. As another example, in some embodiments, if the virtual private network's initial IP address range is in one of the private IP address spaces as defined by RFC 1918 for IPv4, the customer may not be allowed to add address ranges from the other IPv4 private address spaces to their virtual private network. As another example, in some embodiments, certain IP address ranges may be used by provider network processes or services, and customers may not be allowed to create virtual private networks with local IP address ranges that overlap the reserved ranges, or to add additional IP address ranges that overlap the reserved ranges.

Embodiments of virtual private network resizing methods and apparatus may allow customers of a provider network to launch a virtual private network using an IP address space that is right for the foreseeable future, and to add additional IP address space when (and if) needed. As an example use case, a provider network customer that needs hundreds of virtual private networks in their provider network implementation but that has a constrained IP address space may launch the virtual private networks with relatively small CIDR blocks, and may add additional CIDR block(s) to any virtual private network that outgrows the initial small size, thus allowing the customer to use their IP address space efficiently.

FIGS. 1A through 1G graphically illustrate resizing virtual private networks in provider network environments, according to some embodiments. Note that the IP address ranges used in the Figures are given by way of example, and are not intended to be limiting.

FIG. 1A illustrates an example virtual private network with an initial IP address range, according to some embodiments. A customer may provision and manage a virtual private network 110A on provider network 100 from an external customer network 192A over an intermediate network 180 such as the Internet via one or more APIs 106 to a control plane 104 of the provider network 100. For example, the customer may manage their private network 110A from graphical user interfaces (GUIs) and/or command line interfaces (CLIs) from a console in customer network 192A. Note that virtual private network 110A may include other components than those shown in FIG. 1A.

Private network 110A may include resource instances 116 executing as virtual machines (VMs) on host devices of the provider network 100. Private network 110A may also include networking devices such as one or more gateways 111 and one or more routers 112. In at least some embodiments of a provider network 100, private network 110A networking devices such as gateways 111 and routers 112A may be virtual networking devices on the provider network 100. A virtual gateway 111 or virtual router 112 may, for example, be implemented in the hypervisor on a host device. A hypervisor, or virtual machine monitor (VMM), on a host device may be described as the software, firmware, and/or hardware that provides an execution environment for the virtual machines on the host device. Network traffic to and from the virtual machines executing on a host device may pass through and be processed by the hypervisor on the host device. Alternatively, a gateway 111 or router 112 may be implemented as a virtual machine executing on a host device of the provider network 100. Alternatively, a gateway 111 or router 112 may be implemented as a physical networking device on the provider network 100, or as a virtual device on a networking device on the provider network 100.

In some embodiments, the provider network 100 may allow the customer to establish a dedicated network connection, referred to as a direct connection 194, from customer network 192A to virtual private network 110 on the provider network 100. The direct connection 194 may, for example be established between a gateway 111 of virtual private network 110 and a gateway at customer network 192A. A direct connection 194 may be a private communications channel, and may provide secure communications and higher bandwidth throughput than is available over an Internet-based connection. Once a direct connection 194 is established between virtual private network 110A and customer network 192A, routing tables used by router(s) 112 in private network 110A and router(s) in customer network 192A may be configured with routes to the direct connection 194, and endpoints in the two networks may then begin communicating over the direct connection 194. In some embodiments, private network 110A is not allowed to have IP address ranges that overlap with the IP address range(s) of external network 192A to which direct connection 194 is established.

Conventionally, packet flows between endpoints (e.g., customers' resource instances 116) in different private networks 110 on the provider network 100 are routed through the network substrate of the provider network 100 to an intermediate public network 180 such as the Internet. The intermediate network 180 routes the packets back to the provider network 100. On the provider network 100, the packets are then routed over the network substrate to the destination private network 100. In some embodiments of a provider network 100, to provide a virtual analog to physical transit centers at which physical cables between data centers are patched to create a peering between the respective private networks at the data centers in the virtual network environment within a provider network 100, a peering service and API may be provided that allow customers to request and accept virtual peerings 196 between private networks 110 on the provider network 100. A private network peering 196 allows packets to flow between endpoints in the two private networks 110 over the provider network 100's network substrate without passing through the intermediate public network 180. Once a peering 196 is established between two virtual private network 110, routing tables used by router(s) 112 in the private networks 110 may be configured with routes to the peering 196 connection, and endpoints in the two private networks 110 may then begin communicating over the peering 196 as if the two virtual private networks 110 were connected by a physical cable. FIG. 1A shows a virtual peering 196 connection between virtual private network 110A and virtual private network 110B. In some embodiments, peered private networks 110 are not allowed to have overlapping IP address ranges.

Virtual private network 110A has been created with an initial IP address space (in this example, the IPv4 CIDR block 10.0.0.0/16). In this example, two subnets, subnet 114A with CIDR block 10.0.0.0/24 and subnet 114B with CIDR block 10.0.1.0/24, have been created in private network 110A's IP address space. Resource instances 116A are assigned IP addresses in subnet 114A, and resource instances are assigned IP addresses in subnet 114B. In some embodiments, each subnet 114 may include at least one router 112 that acts to route traffic to (and from) resource instances 116 on the respective subnet 114.

While not shown in FIG. 1A, in some embodiments, a provider network 100 may include one or more regional networks; each regional network may include multiple availability zones. Each availability zone may be implemented by one or more data centers within the respective regional network; a data center may implement one or more availability zones. The availability zones in a regional network may be connected through low-latency links (e.g., dedicated high-bandwidth fiber-optic links) and collectively form the regional network. Communications between endpoints in different availability zones within a regional network may go over the intermediate network 180 or over the low-latency links. When the customer creates private network 110A in a regional network, the private network 110A spans all the availability zones in the regional network. After creating the private network 110A, the customer can add one or more subnets 114 in each availability zone. When the customer creates a subnet 114 for private network 110A in an availability zone, the customer specifies the CIDR block for the subnet, which is a subset of the private network 110A CIDR block (10.0.0.0/24, in this example). In some embodiments, each subnet 114 resides entirely within one availability zone and does not span availability zones. By launching resource instances 116A and 116B in separate availability zones, the customer can protect their applications from the failure of a single availability zone.

Control plane 104 may maintain metadata about private networks 110 on provider network, for example in a control plane (CP) data store 105. CP data store 105 may include a descriptor record for each private network 110 on the provider network 110. When the customer creates or modifies private network 110A, information about the private network 110A may be written to, updated in, or read from the private network 110's descriptor record in data store 105. FIG. 9 illustrates an example descriptor record for a private network that includes descriptions of the private network's CIDR blocks. A descriptor record for a private network 110 may include one or more of, but is not limited to: the private network name, a private network identifier, the CIDR block of the private network 110, subnet(s) of the private network 110, information identifying other private networks 110 that are peered with the private network 110, information about external network(s) 192 that are connected with the private network 110 via direct connections 194, routing information for the private network 110, and so on.

Provider network 100 may implement one or more services 108 that may perform various functionalities for private networks 110. As a non-limiting example, a metadata service may execute in the provider network 100, for example on each on host device that executes VMs, that exposes an interface to resource instances 116 that allows an executing resource instance 116 to obtain metadata about its respective private network 110 (e.g., information about the private network's IP address space(s), etc.) and metadata about the resource instance 116 (e.g., its MAC address, local IP address, etc.). As another example, a direct connect service may support the establishment and management of direct connections 194 to external networks 192 from private networks 110. As another example, a peering service may support the establishment and management of peering 196 connections between private networks 110.

As shown in FIG. 1A, customer network has the IP address space hij.kl.m.n/yy which does not overlap with the IP address space of private network 110A (10.0.0.0/16), and private network 110B has the IP address space pqr.st.u.v/zz which does not overlap with the IP address space of private network 110A.

Figure 8A:
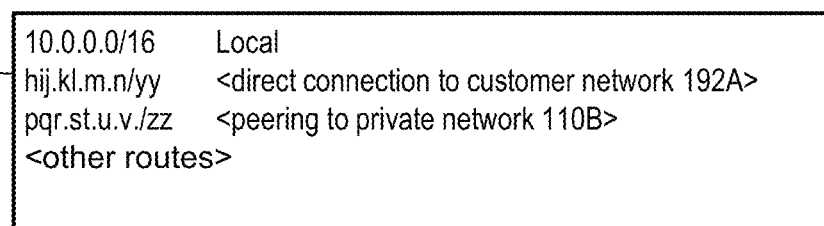
FIG. 8A illustrates an example route table for a private network, according to some embodiments.

As shown in FIG. 1A, endpoints on external networks 192 may communicate with endpoints on private network 110A (e.g., resource instances 116A and 116B). Network traffic (e.g., IP packets) from the external endpoints to endpoints on the private network 110A are routed over the intermediate network 180 to an edge device of the provider network 100. At the edge device, the packets may be encapsulated and routed over the network substrate of the provider network 100 to a gateway 111 that controls public access to the private network 100. The gateway 111 forwards network packets to routers 112 of the private network 110A, which route the packets to the appropriate resource instances 116A and 116B on the respective subnets 114A and 114B according to routing information maintained in route table(s) for the private network 110A. FIG. 8A illustrates an example route table for private network 110A. Similarly, network traffic (e.g., IP packets) from the resource instances 116A and 116B are routed to the gateway 111, which sends the packets over the network substrate to an edge device of the provider network 100 to be routed over the intermediate network 180 to respective endpoints on the external networks 192. Note that at least some endpoints on customer network 192A may also or instead communicate with resource instances 116A and 116B on the private network 110A over direct connection 194. In addition, endpoints on private network 110B may communicate with resource instances 116A and 116B through peering 196 connection.

Figure 1B:
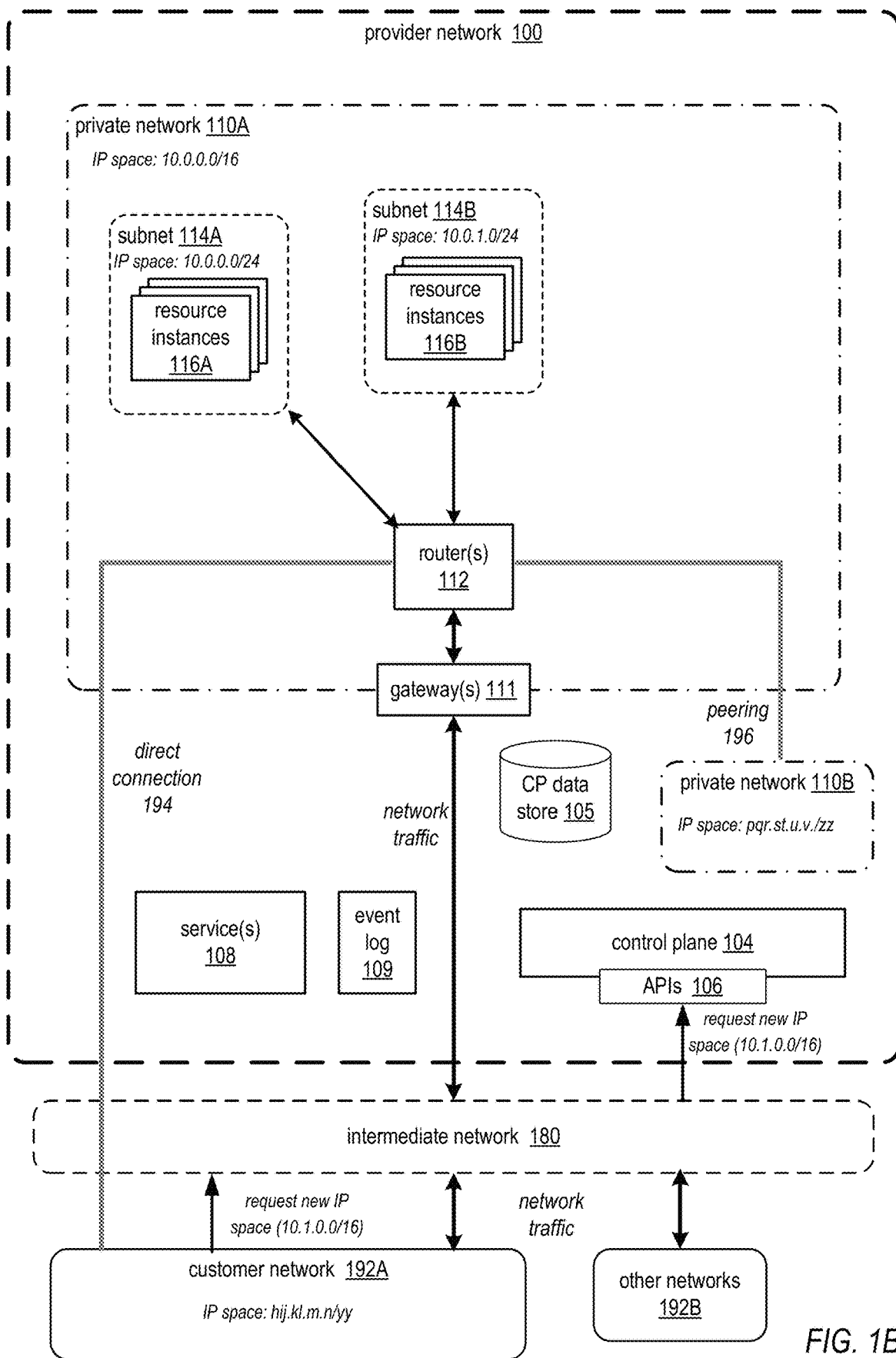
Figure 11A:
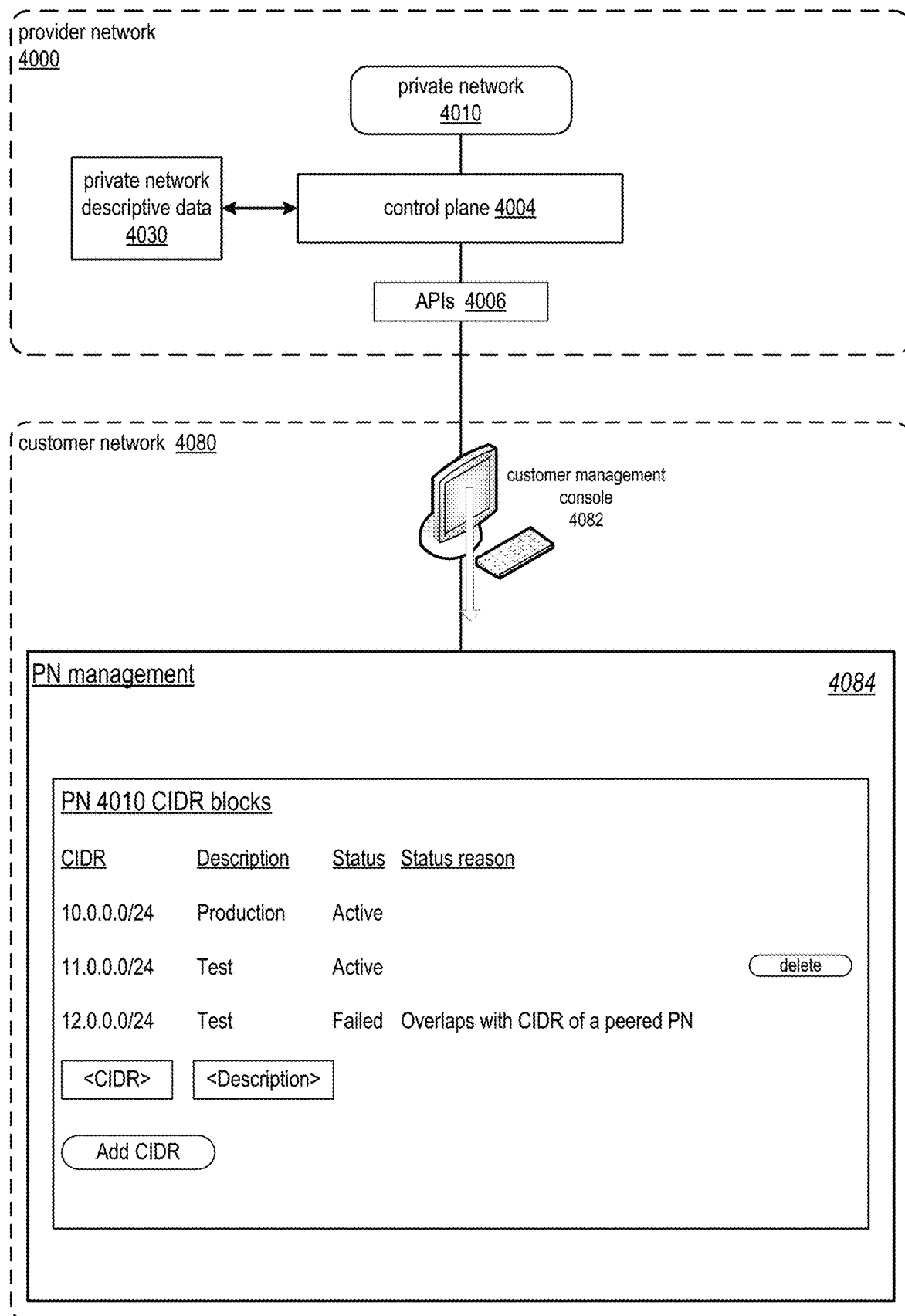
FIGS. 11A through 11D illustrate an example interface for adding IP address spaces to a private network, according to some embodiments.
Figure 11B:
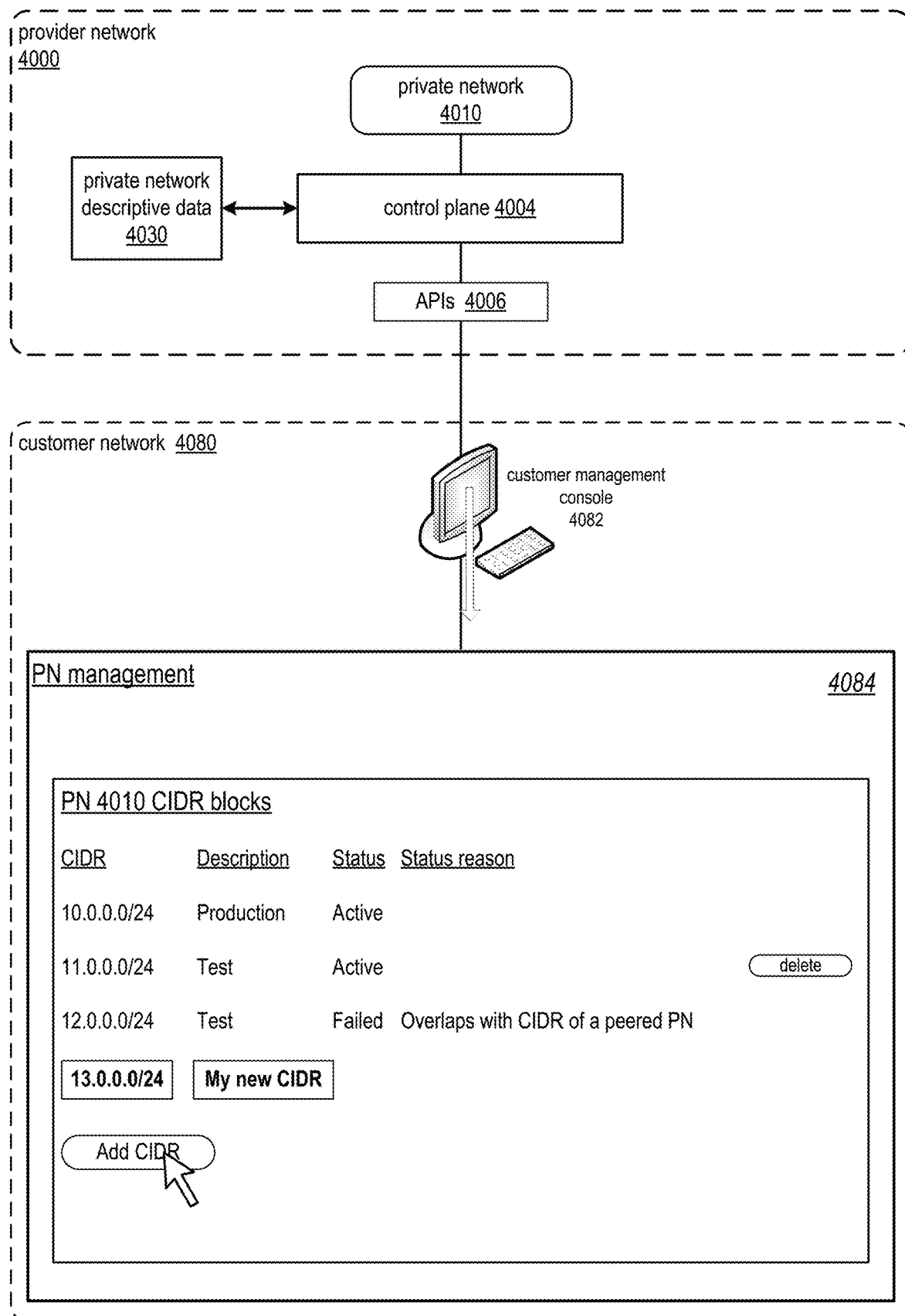
Figure 11C:
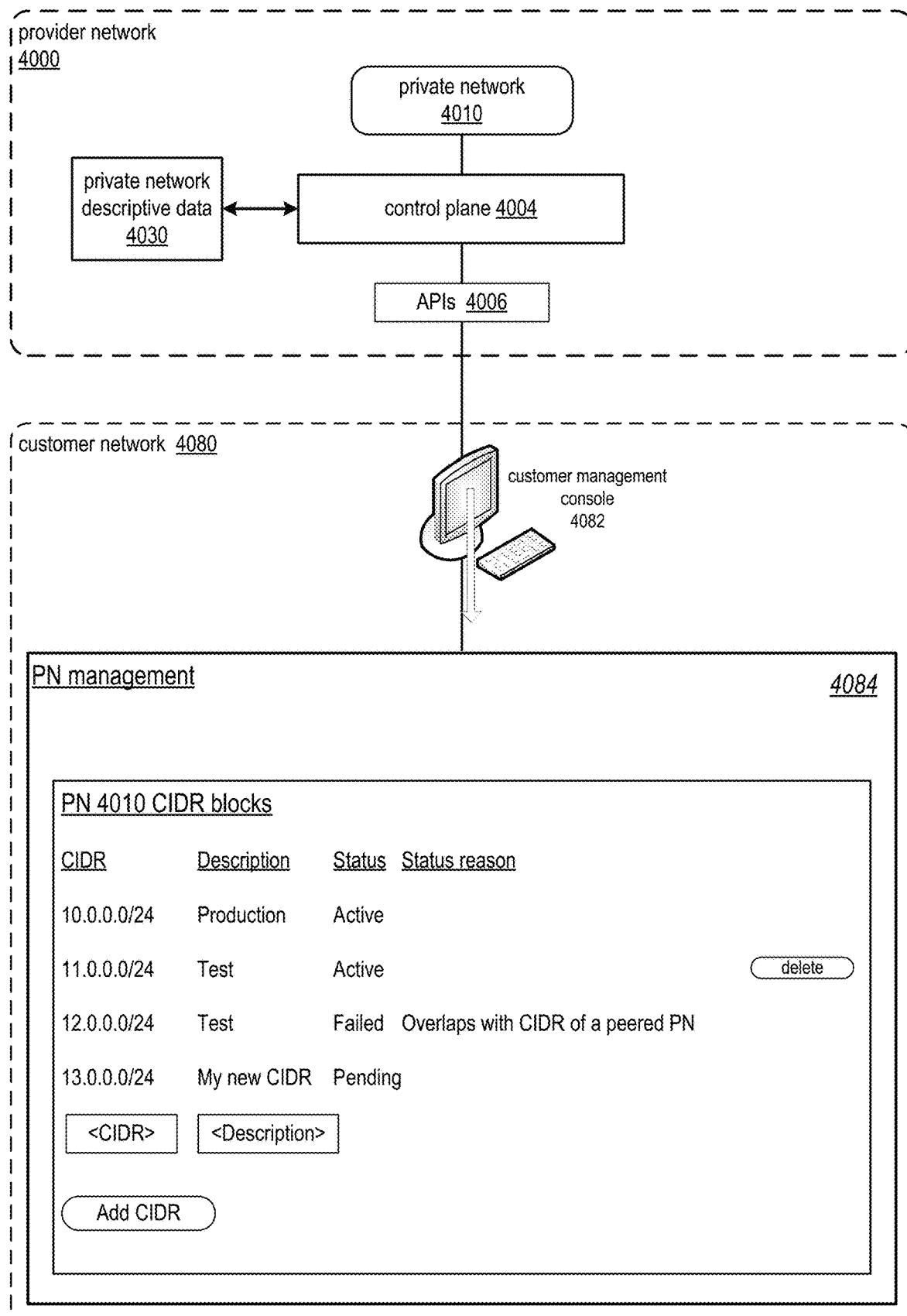

FIG. 1B illustrates the customer requesting an additional IP address space for the example virtual private network of FIG. 1A, according to some embodiments. Embodiments of virtual private network resizing methods and apparatus as described herein may allow the customer to request additional IP address spaces (e.g., additional CIDR blocks, for example 10.1.0.0./16) for their existing virtual private network 110A (e.g., created with an initial CIDR block 10.0.0.0/16) on the provider network 100. In some embodiments, the customer may request that a specified IP address space (10.1.0.0./16, in this example) be added to their virtual private network 110A via an API 106 to a control plane 104 process of the provider network 100. In some embodiments, a graphical user interface (GUI) to API 106 may be provided on a console on customer network 192A via which the customer may, for example, request additional IP address spaces for private network 110A. FIGS. 11A through 11D illustrate an example interface for adding IP address spaces to a private network; FIG. 11B illustrates a customer requesting that a specified new CIDR block be added to the customer's private network. FIG. 11C illustrates that the interface may be updated to indicate that the requested CIDR block is in a pending state. In some embodiments, other methods may be used instead of or in addition to a GUI to access functionality of the API 106 including but not limited to requesting additional IP address spaces, for example a command line interface (CLI). In FIG. 1B, the customer has requested a new IP address space (10.1.0.0./16, in this example) be added to virtual private network 110A.

Figure 1C:
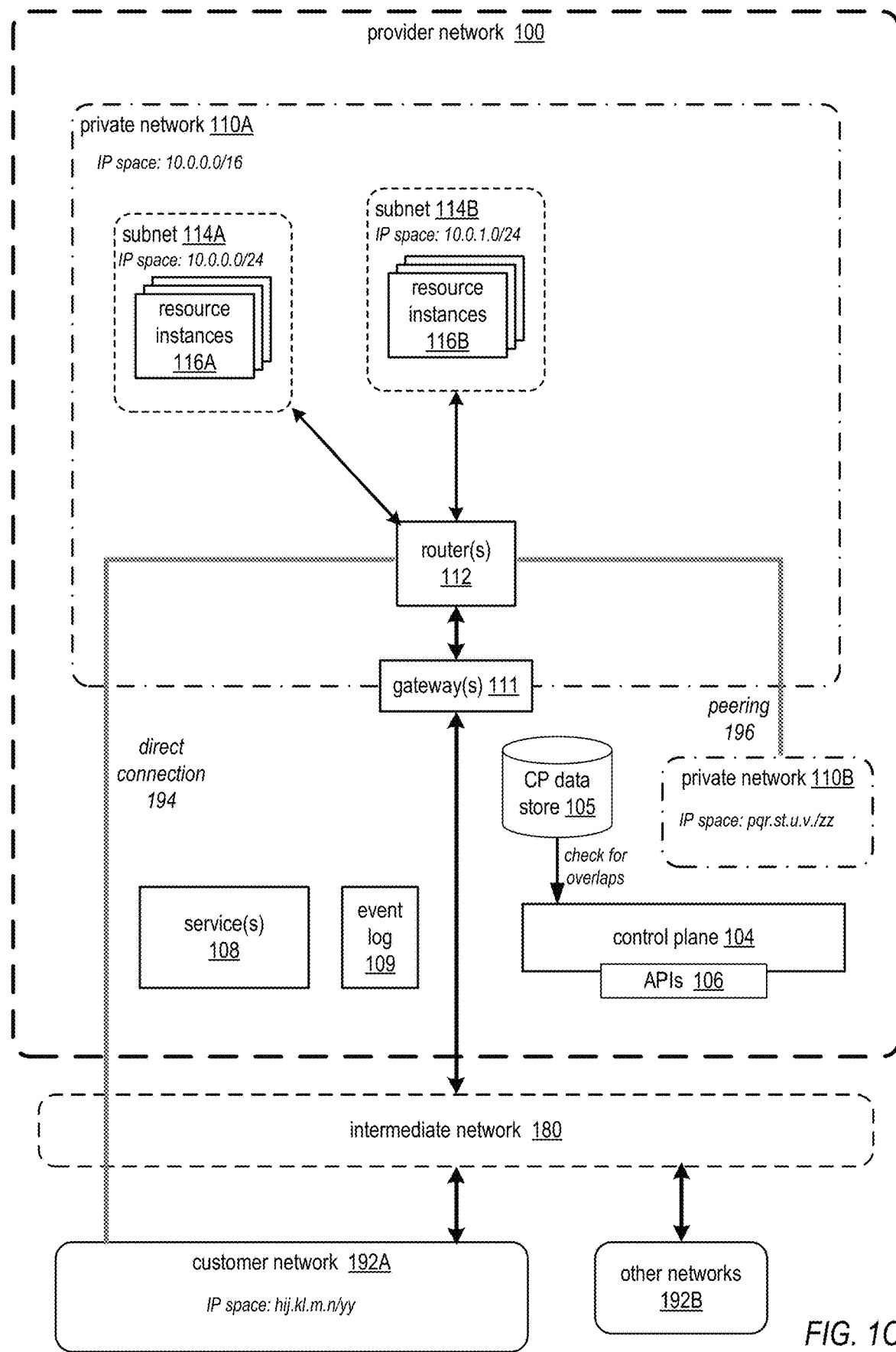

FIG. 1C illustrates checking for conflicts with a requested IP address space in the example virtual private network of FIG. 1A, according to some embodiments. For example, the customer may not be allowed to add CIDR blocks that overlap with the primary CIDR block of private network (10.0.0.0/16, in this example) or any previously added CIDR blocks, or CIDR blocks that overlap with other IP address spaces that are associated with the virtual private network (e.g., the IP address space of external network 192A connected to the virtual private network 110A via direct connection 194, and the IP address space of private network 110B connected to private network 110A through peering 196) or that overlap existing routes in route tables of private network 110A.

In some embodiments, after receiving the request to add new IP address space 10.1.0.0./16 to private network 110A, the control plane 104 may check to insure that the specified IP address space does not overlap with IP address spaces that are associated with the virtual private network 110A. For example, the control plane 104 may check one or more of, but not limited to, existing IP address space(s) of the virtual private network 110A (initial CIDR block 10.1.0.0./16, in this example), the IP address space(s) of one or more external networks 192 that are connected to virtual private network 110A via a direct connection 194 (external network 194A, in this example), the IP address space(s) of one or more other virtual private networks 110 that are connected to virtual private network 110A through a virtual peering connection 196 (private network 110B, in this example), and existing routes in the virtual private network 110A route tables. In some embodiments, the control plane 104 may access private network 110A's descriptor record in CP data store 105 to obtain the IP address space and route information to be checked for overlaps with the new CIDR block.

In some embodiments, the provider network 100 may impose one or more other restrictions on the IP address ranges that the customer is allowed to add to add to private network 110A, and in FIG. 1C the control plane 104 may also check to insure that the requested IP address space does not violate any of these restrictions. As an example, in some embodiments, if private network 110A's initial IP address range is in one of the private IP address spaces as defined by RFC 1918 for IPv4, the customer may not be allowed to add address ranges from the other IPv4 private address spaces to private network 110A. As another example, in some embodiments, certain IP address ranges may be used by provider network 100 processes or services 108, and the customer may not be allowed to create private network 110A with an IP address space that overlaps the reserved ranges, or to add additional IP address spaces that overlap the reserved ranges.

Figure 1D:
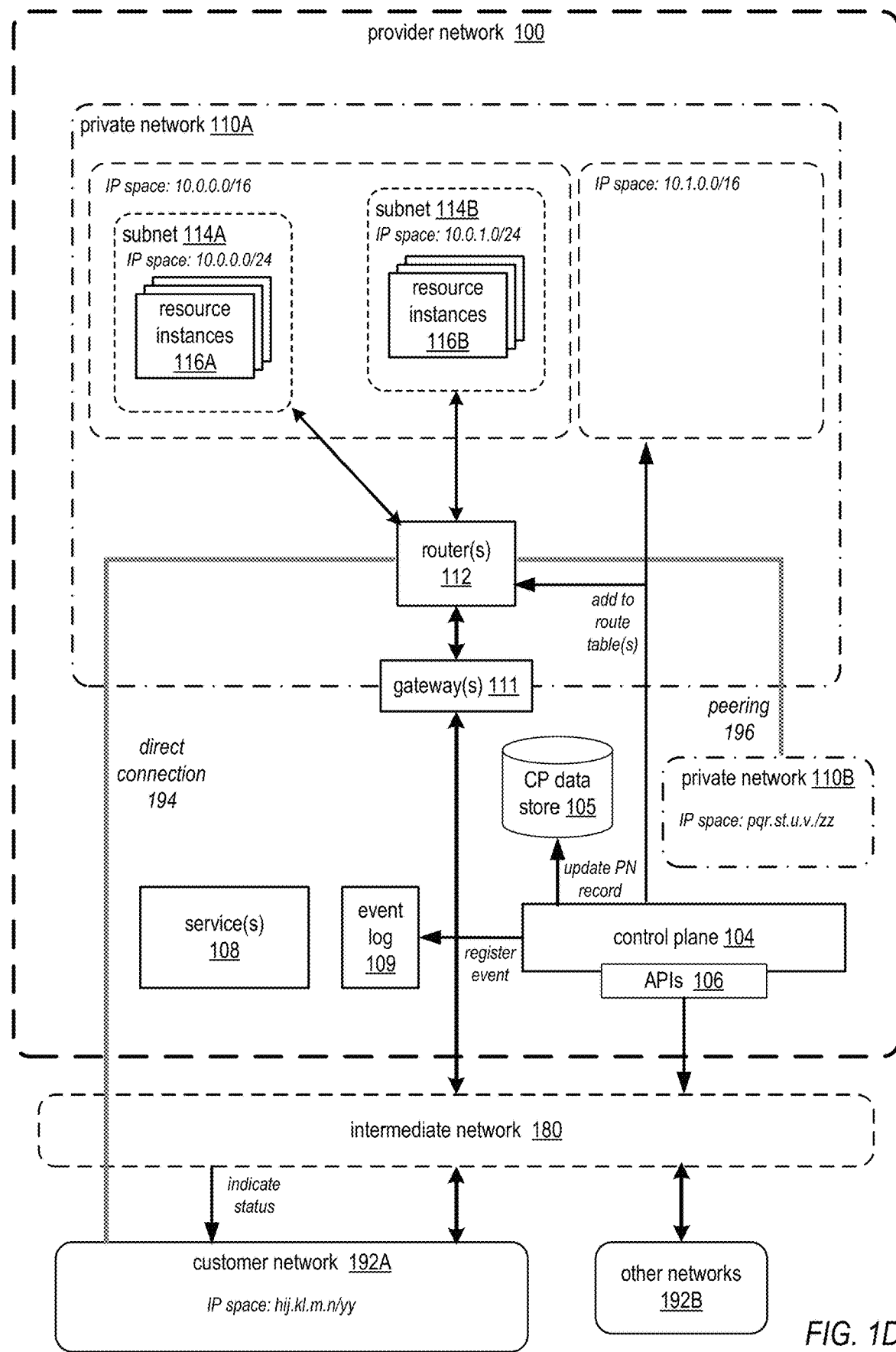
Figure 8B:
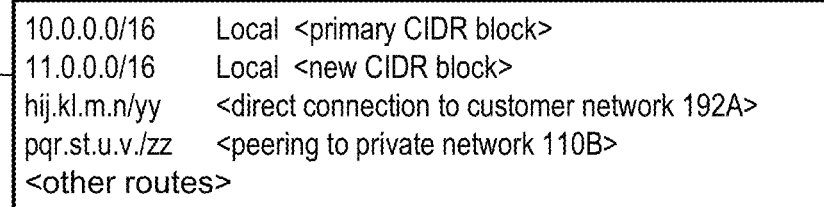
FIG. 8B illustrates the example route table of FIG. 8A after adding a new IP address space to the private network, according to some embodiments.

FIG. 1D illustrates configuring the IP address space in the example virtual private network of FIG. 1A, according to some embodiments. Upon determining that the new IP address space (CIDR block 10.1.0.0./16, in this example) does not overlap with IP address spaces that are associated with the virtual private network 110A, and in some embodiments that the new IP address place does not violate one or more other restrictions, the control plane 104 may configure private network 110A with the new IP address space as illustrated in FIG. 1D. In some embodiments, configuring private network 110A may include, but is not limited to, adding the CIDR block to route table(s) of private network 110A. FIG. 8B illustrates an example route table after adding a new IP address space to a virtual private network.

Figure 11D:
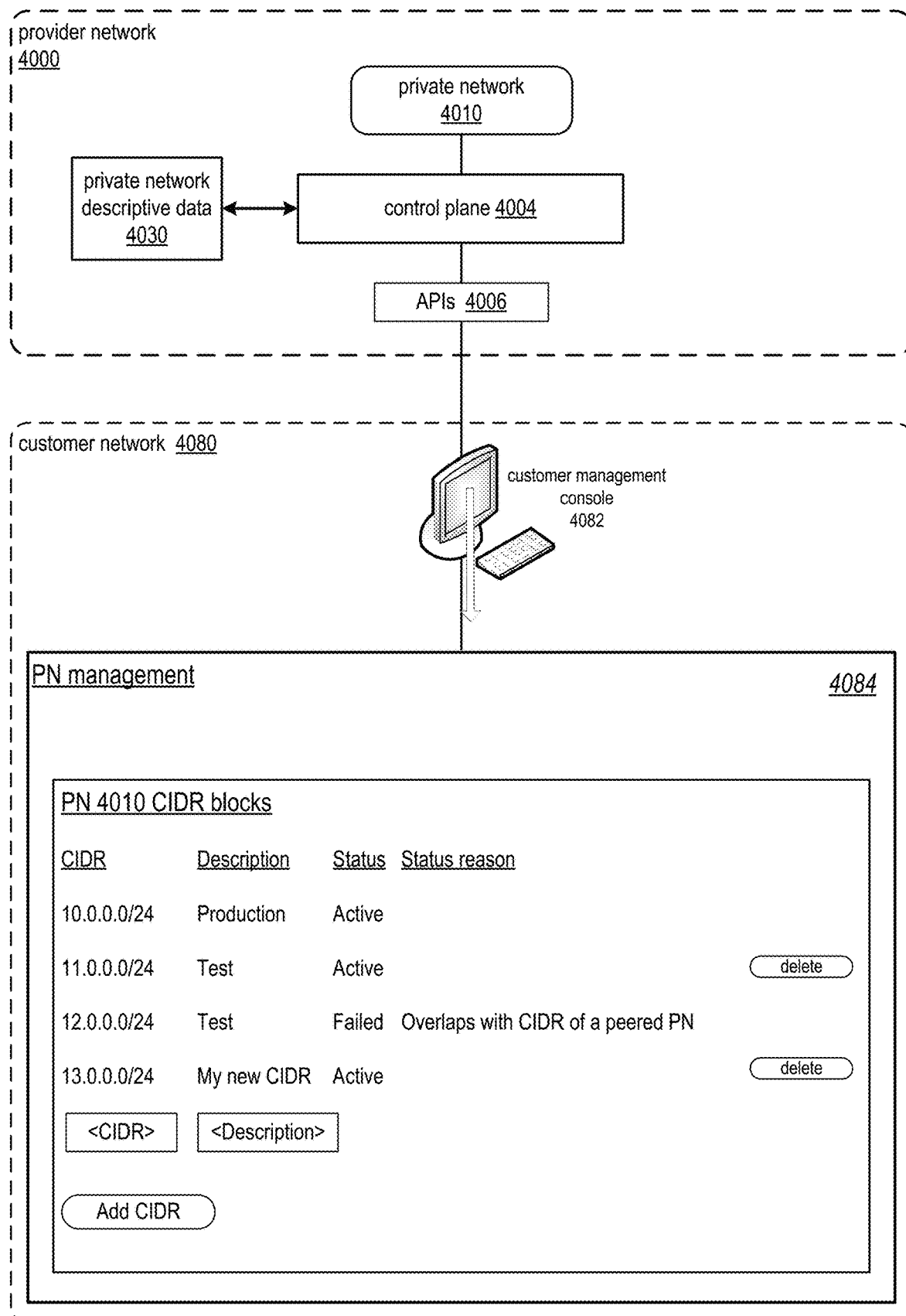

In some embodiments, control plane 104 may perform one or more other tasks upon determining that the new IP address space can be added to private network 110A. For example, in some embodiments, the control plane 104 may update private network 110A's descriptor record to add the new IP address space (CIDR block 10.1.0.0./16, in this example). FIG. 9 illustrates an example descriptor record for a private network that includes descriptions of the private network's CIDR blocks. In some embodiments, control plane 104 may write events indicating changes to private networks 110 to an event log 109; services 108 may asynchronously consume the events from event log 109 to update their information about private networks 110 and perform one or more tasks in response to the events as necessary. In these embodiments, control plane 104 may write an event to event log 109 indicating that the new IP address space has been added to private network 110A. In some embodiments, control plane 104 may provide an indication to the customer via API 106 that the new IP address space has been added to private network 110A. For example, FIG. 11D illustrates that an interface displayed on the customer's console as described in reference to FIG. 1B may be updated to indicate that the requested CIDR block is now active.

Figure 10:
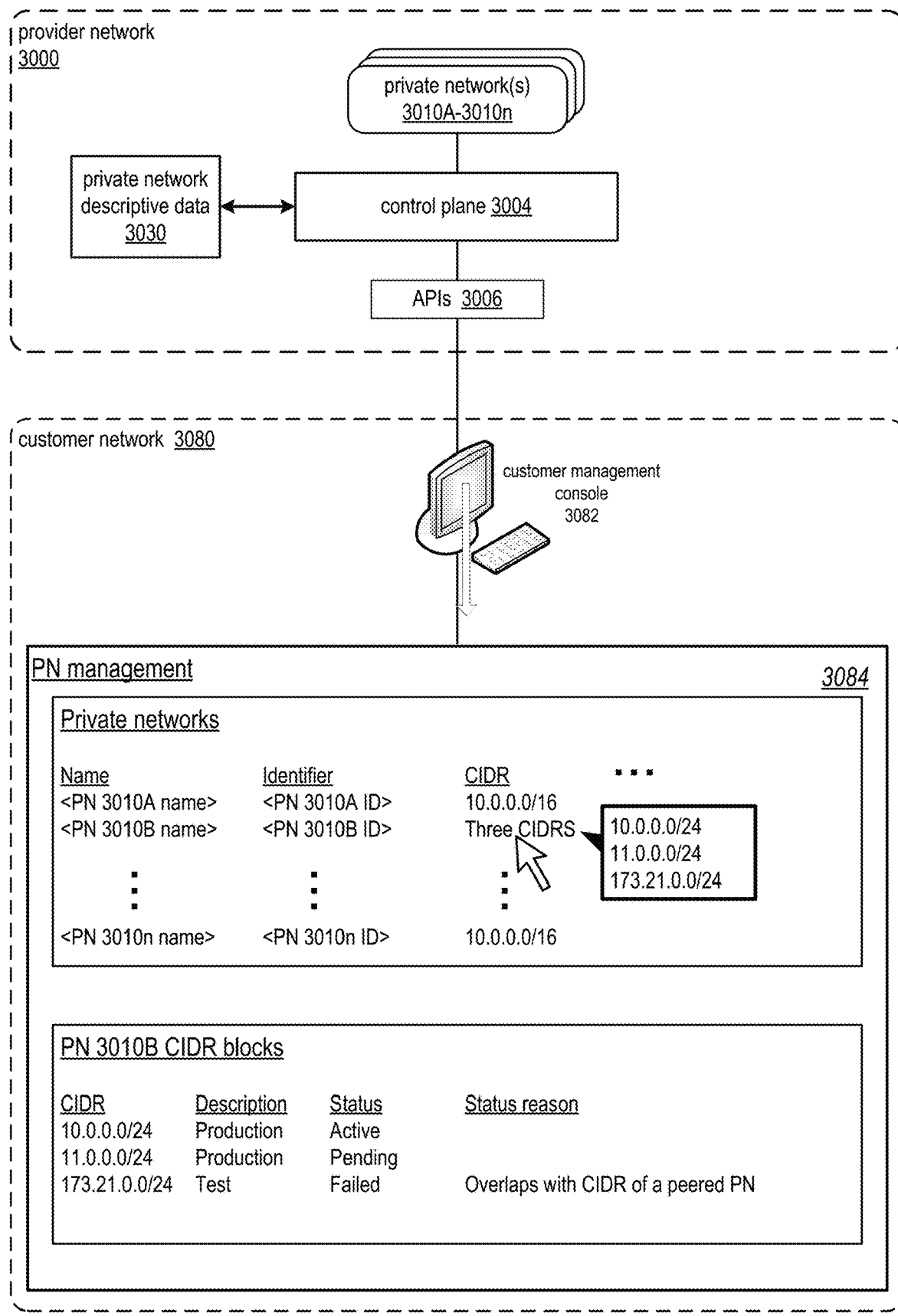
FIG. 10 illustrates an example interface for viewing information about private networks including IP address spaces, according to some embodiments.

While not shown in FIG. 1D, upon determining that the new IP address space cannot be added to private network 110A for some reason, in some embodiments, control plane 104 may provide an indication to the customer that the new IP address space cannot be added to private network 110A, and may provide a reason that the new IP address space cannot be added. For example, FIGS. 10 and 11A illustrate that one or more interfaces displayed on the customer's console may indicate that a request for a new CIDR block has failed, and may include a reason for the failed status (e.g., "overlaps with CIDR block of a peered private network"). Other reasons for failure may include, but are not limited to, overlapping with a CIDR block of an external network with a direct connection to the private network 110, overlapping with existing routes in the private network 110's route tables, and overlapping with a reserved IP address space.

Figure 1E:
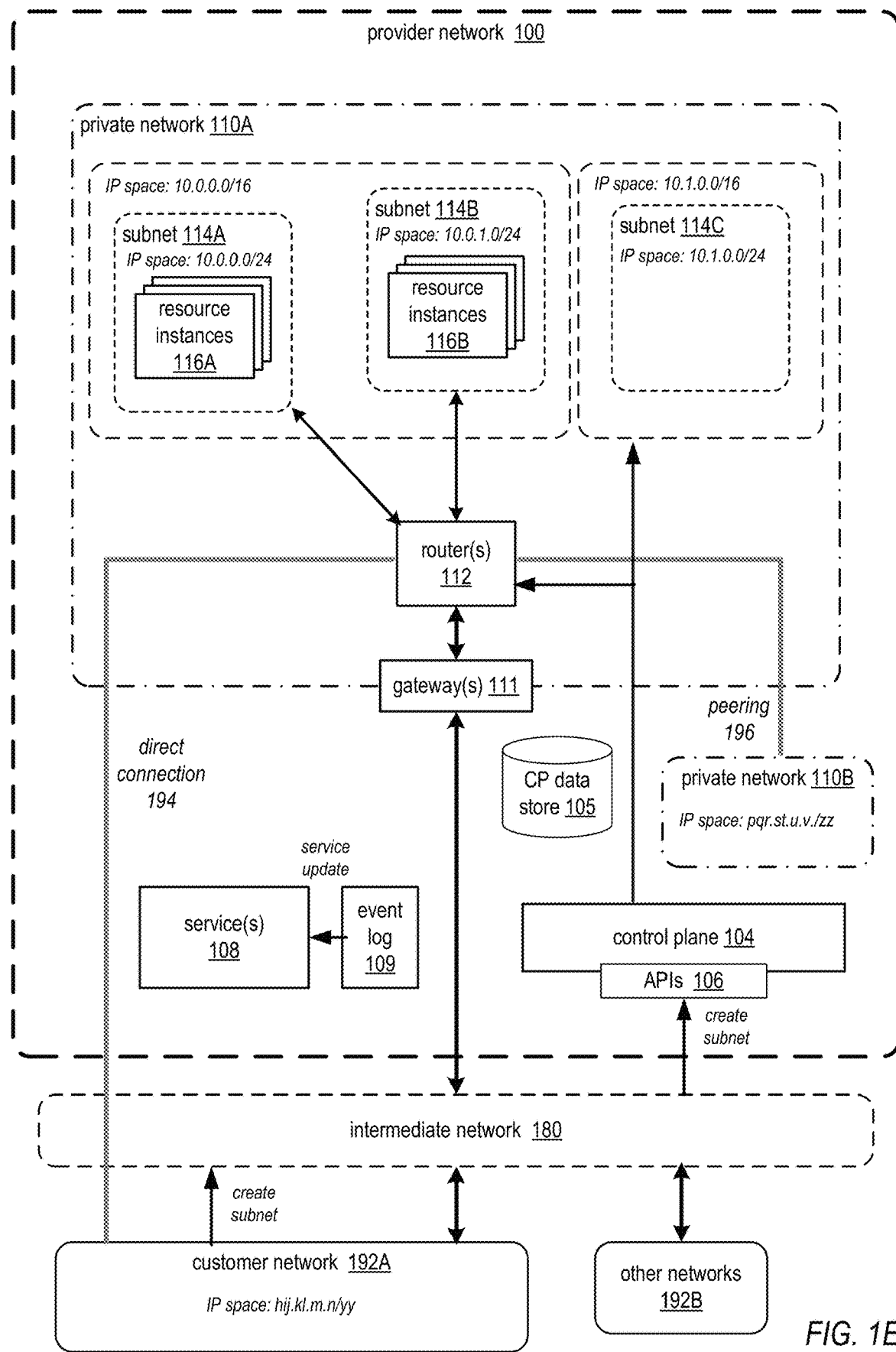

FIG. 1E illustrates the customer creating a subnet in the new IP address space, according to some embodiments. In some embodiments, once the new IP address space (CIDR block 10.1.0.0./16, in this example) has been added, or when requesting the new IP address space, the customer may specify one or more subnets 114C for the new IP address space. In some embodiments, the subnet may be specified as the same CIDR block as the new IP address space, or alternatively one or more CIDR blocks that are subsets of the new CIDR block can be specified to provide one or more subnets 110C in the new IP address space. In this example, CIDR block 10.1.0.0/24 has been specified as a subnet 110C for the new IP address space 10.1.0.0./16. In some embodiments, at least one router 112 may be provisioned for the subnet 110C, and one or more route tables of private network 110A may be updated to include the new subnet 114C.

In some embodiments, control plane 104 may perform one or more other tasks when creating a subnet 110C. For example, in some embodiments, the control plane 104 may update private network's descriptor record to add subnet 110C. In some embodiments, control plane 104 may write an event to event log 109 indicating the new subnet 110C. In some embodiments, control plane 104 may provide an indication to the customer that the new subnet 110C has been created, for example via an interface displayed on the customer's console as illustrated in FIG. 10 or 11A.

Figure 1F:
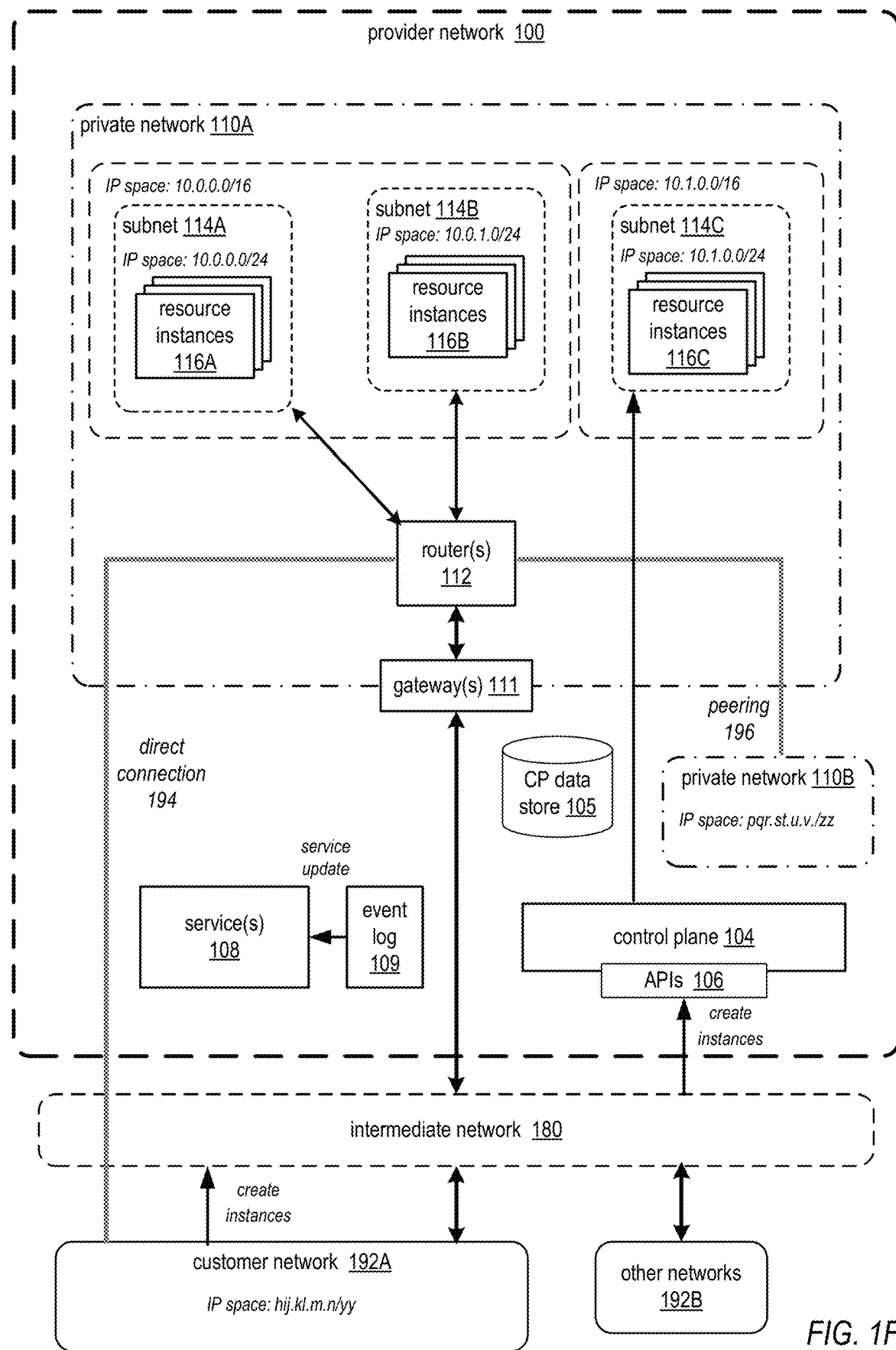

FIG. 1F illustrates the customer adding resources in the new IP address space for the example virtual private network of FIG. 1A, according to some embodiments. In some embodiments, once the new IP address space (CIDR block 10.1.0.0./16, in this example) has been added and a subnet 110C has been created (CIDR block 10.1.0.0./24, in this example) in the new IP address space, the customer may add one or more resource instances 116C in the subnet 110C, for example via an interface displayed on the customer's console. The resource instances 116C are assigned IP addresses in subnet 114C.

Figure 1G:
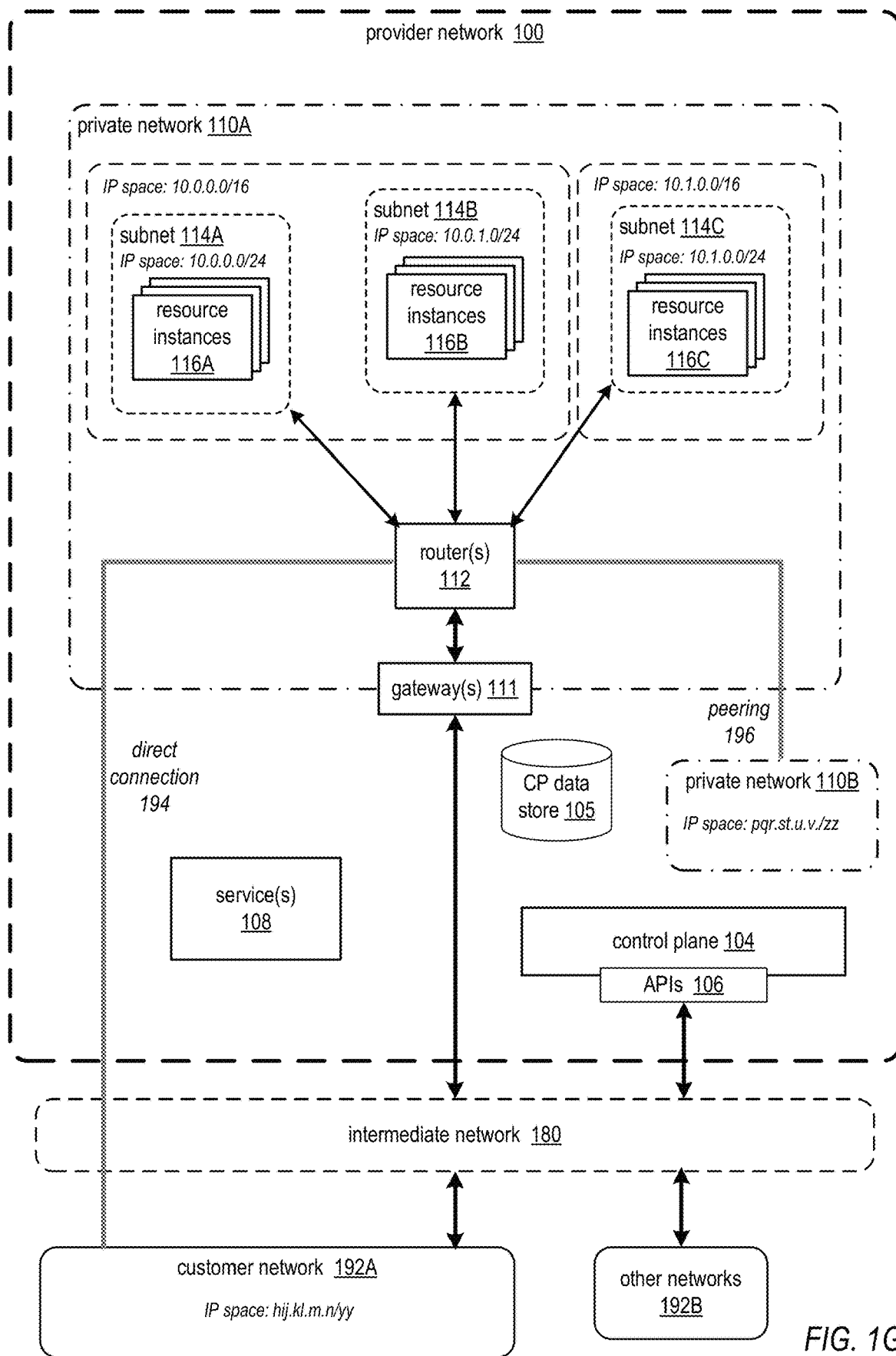

FIG. 1G illustrates the example virtual private network of FIG. 1A after the new IP address space has been fully configured in the virtual private network, according to some embodiments. As shown in FIG. 1B, endpoints on external networks 192 may communicate with endpoints on private network 110A (e.g., resource instances 116A, 116B, and 116C). Network traffic (e.g., IP packets) from the external endpoints to endpoints on the private network 110A are routed over the intermediate network 180 to an edge device of the provider network 100. At the edge device, the packets may be encapsulated and routed over the network substrate of the provider network 100 to a gateway 111 that controls public access to the private network 100. The gateway 111 forwards network packets to routers 112 of the private network 110A, which route the packets to the appropriate resource instances resource instances 116A, 116B, and 116C on the respective subnets 114A, 114B, and 114C according to routing information maintained in route table(s) for the private network 110A. Similarly, network traffic (e.g., IP packets) from the resource instances 116A, 116B, and 116C are routed to the gateway 111, which sends the packets over the network substrate to an edge device of the provider network 100 to be routed over the intermediate network 180 to respective endpoints on the external networks 192. Note that at least some endpoints on customer network 192A may also or instead communicate with resource instances 116A, 116B, and 116C on the private network 110A over direct connection 194. In addition, endpoints on private network 110B may communicate with resource instances 116A, 116B, and 116C through peering 196 connection.

Figure 2:
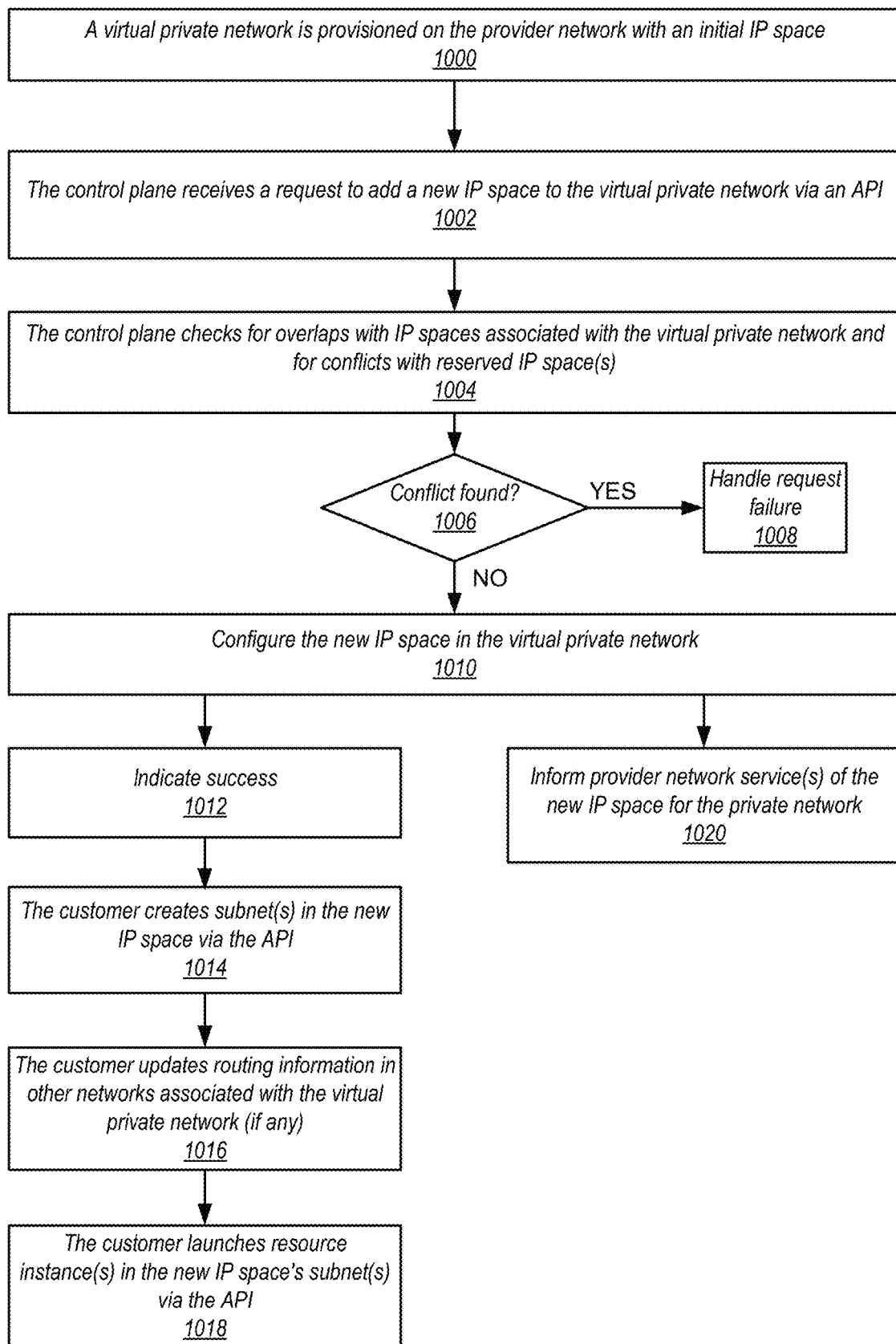
FIG. 2 is a flowchart of a method for resizing private networks in provider network environments, according to some embodiments.

FIG. 2 is a flowchart of a method for resizing virtual private networks in provider network environments, according to some embodiments. The method of FIG. 2 may, for example, be employed in a provider network environment, for example as illustrated in FIGS. 1A through 1G.

As indicated at 1000, a virtual private network is provisioned on the provider network with an initial IP address space. The virtual private network may be launched in the provider network with a customer-specified IP address space (e.g., an IPv4 CIDR block, or alternatively IPv6) CIDR block. In some embodiments, the customer may also specify one or more subnets in their virtual private network's IP address space.

As indicated at 1002, the control plane of the provider network receives a request to add a new IP address space to the virtual private network via an API. In some embodiments, a graphical user interface (GUI) may be provided on a console on the customer's external network via which the customer may, for example, request additional IP address spaces for their private network via the API. FIGS. 11A through 11D illustrate an example interface for adding IP address spaces to a private network; FIG. 11B illustrates a customer requesting that a specified new CIDR block be added to the customer's private network. In some embodiments, the interface may be updated to indicate that the requested CIDR block is in a pending state, for example as illustrated in FIG. 11C.

As indicated at 1004, the control plane checks for overlaps with the IP address spaces of other networks associated with the virtual private network (if any). For example, the control plane 104 may check one or more of, but not limited to, existing IP address space(s) of the virtual private network, the IP address space(s) of one or more external networks that are connected to the virtual private network via a direct connection, the IP address space(s) of one or more other virtual private networks that are connected to the virtual private network through a virtual peering connection, and existing routes in the virtual private network route tables. In some embodiments, the control plane may access a descriptor record of the virtual private network to obtain the IP address space and route information to be checked for overlaps with the new IP address space. In some embodiments, the control plane may also check to make sure that the requested IP address space does not conflict with one or more IP address spaces that are reserved for use by the provider network. In some embodiments, the provider network may impose one or more other restrictions on the IP address ranges that the customer is allowed to add to add to the virtual private network, and the control plane may also check to insure that the requested IP address space does not violate any of these restrictions.

At 1006, if a conflict is found at 1004, then as indicated at 1008 the control plane may handle failure of the request. For example, the control plane may provide an indication that the request to add the new IP address space to the private network has failed. In some embodiments, the control plane may provide an indication to the customer that the new IP address space cannot be added to the provider network, and may provide a reason that the new IP address space cannot be added. For example, FIGS. 10 and 11A illustrate that one or more interfaces displayed on the customer's console may indicate that a request for a new CIDR block has failed, and may include a reason for the failed status (e.g., "overlaps with CIDR block of a peered private network"). Other reasons for failure may include, but are not limited to, overlapping with a CIDR block of an external network with a direct connection to the private network 110, overlapping with existing routes in the private network 110's route tables, and overlapping with a reserved IP address space.

At 1006, if no conflict is found at 1004, then as indicated at 1010 the new IP address space may be added to the virtual private network. In some embodiments, adding the new IP address space may include adding the new CIDR block to one or more route tables of the virtual private network. In some embodiments, one or more other tasks may be performed upon or after adding the new IP address space to the virtual private network. For example, in some embodiments, the control plane may update the virtual private network's descriptor record to add the new IP address space.

As indicated at 1012, after the new IP address space has been added to the private network, the control plane may indicate that the new IP address space has been added to the private network. For example, FIG. 11D illustrates that an interface displayed on the customer's console may be updated to indicate that the requested new CIDR block is now active. As indicated at 1014, the customer may then create one or more subnets in the new IP address space via the API, for example as illustrated in FIG. 1E. As indicated at 1016, the customer may update routing information in other networks associated with the virtual private network (if any) with the new IP address range of the virtual private network. As indicated at 1018, the customer may then launch resource instance(s) in the new IP address space's subnet(s) via the API, for example as illustrated in FIG. 1E.

Figure 3:
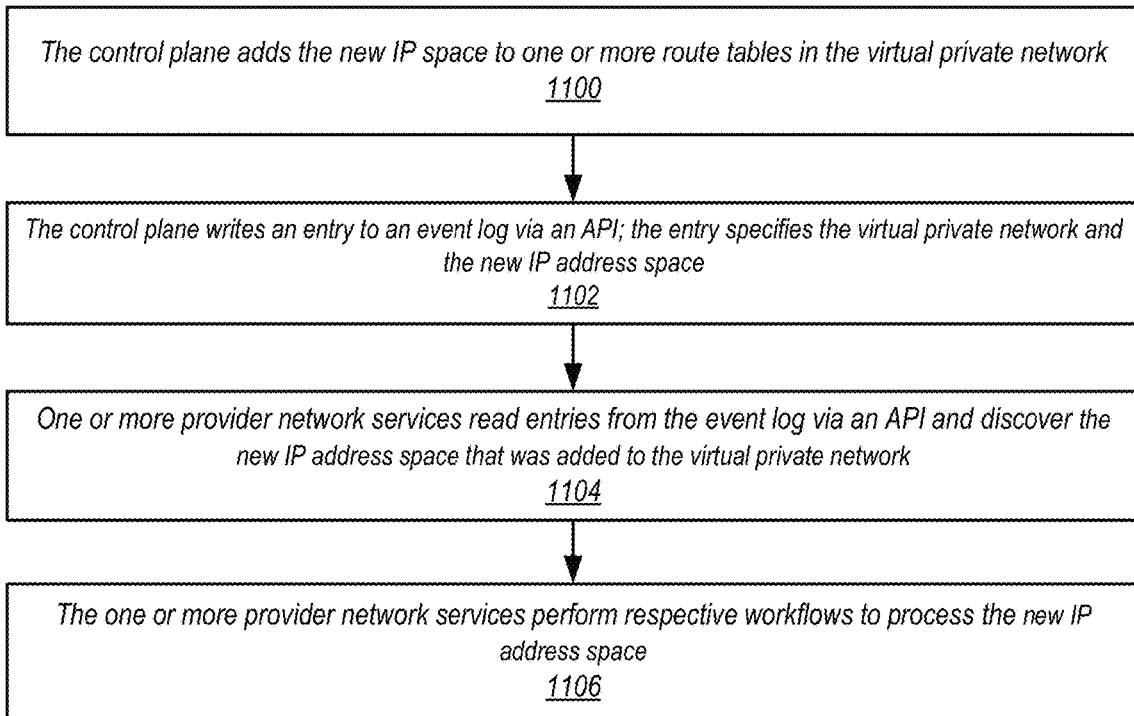
FIG. 3 is a flowchart of a method for informing other services that a new IP address space has been added to a virtual private network, according to some embodiments.

As indicated at 1020, asynchronously to elements 1012 through 1018, one or more provider network service(s) may be informed of the new IP address space for the private network. For example, in some embodiments, the control plane may write events indicating changes to virtual private networks on the provider network to an event log via an API; provider network services that need this information may asynchronously consume the events from the event log via an API to update their information about the virtual private networks and to perform one or more tasks in response to the changes as necessary. In these embodiments, the control plane may write an event to the event log indicating that the new IP address space has been added to the customer's virtual private network. FIG. 3 illustrates a method for informing services that a new IP address space has been added to a virtual private network in more detail. However, note that other methods may be used instead of or in addition to the described method to inform other services that a new IP address space has been added to a virtual private network.

Figure 4:
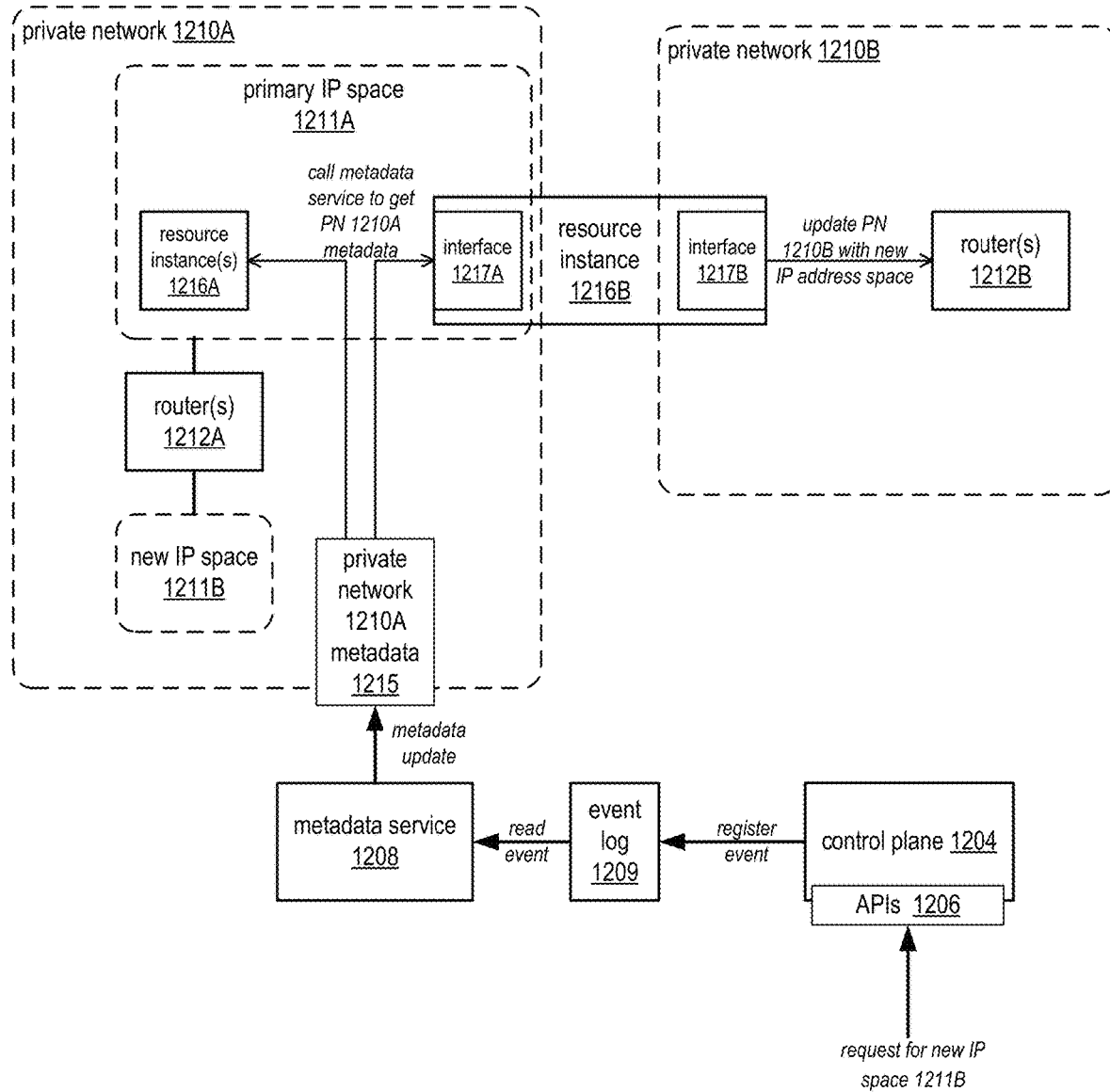
FIG. 4 illustrates a metadata service that updates private network metadata when a new IP address space is added to a virtual private network, according to some embodiments.
Figure 5:
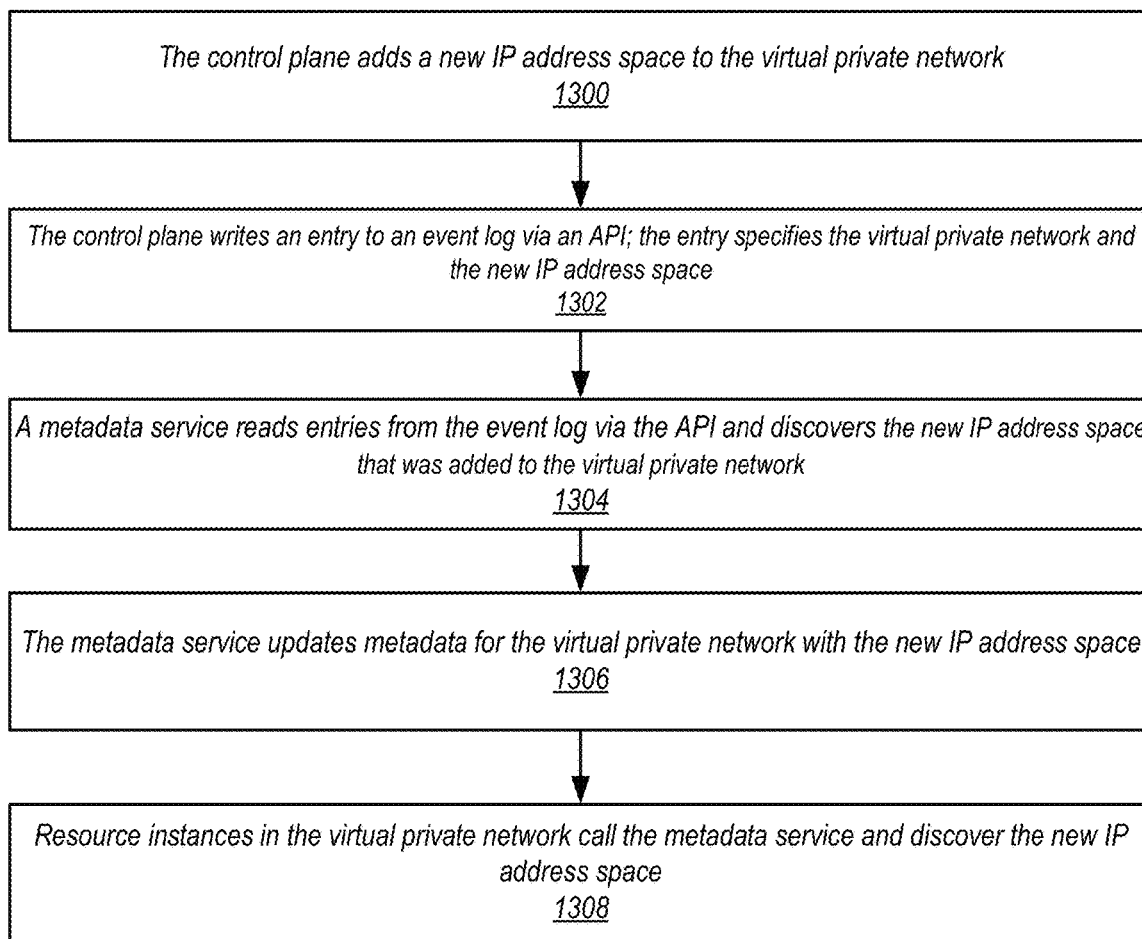
FIG. 5 is a flowchart of a method for propagating a new IP address space in a private network to resource instances in the private network through private network metadata, according to some embodiments.

FIG. 3 is a flowchart of a method for informing other services that a new IP address space has been added to a virtual private network, according to some embodiments. The method of FIG. 3 may, for example, be performed at element 1020 of FIG. 2. As indicated at 1100, the control plane adds the new IP space to one or more route tables in the virtual private network. As indicated at 1102, the control plane writes an entry to an event log via an API; the entry specifies the virtual private network and the new IP address space. As indicated at 1104, one or more provider network services read entries from the event log via an API and discover the new IP address space that was added to the virtual private network. As indicated at 1106, the one or more provider network services may perform respective workflows to process the new IP address space. FIGS. 4 and 5 provide a non-limiting example of a workflow that may be performed by an example service in response to discovering that a new IP address space has been added to a virtual private network.

FIG. 4 illustrates a metadata service that updates private network metadata when a new IP address space is added to a virtual private network, according to some embodiments. A private network 1210A includes one or more routers 1212A, a primary or initial IP address space 1211A in which one or more resource instances 1216A are implemented. A new IP address space 1211B has been added to private network 1210A via API 1206 to control plane 1204. Control plane 1204 registers an event indicating that IP space 1211B has been added to private network 1210A in event log 1209.

The provider network may implement one or more services that may perform various functionalities for private networks 1210. As a non-limiting example, a metadata service 1208 may execute in the provider network, for example on each on host device that executes VMs. The metadata service 1208 may maintain metadata 1215 about private networks 1210, and may expose an interface to resource instances 1216 executing as VMs on the host devices that allows an executing resource instance 1216 to obtain metadata about its respective private network 1210 (e.g., information about the private network's IP address space(s) 1211) and metadata about the resource instance 1216 (e.g., its MAC address, local IP address, etc.). Metadata service 1208 may asynchronously consume the event indicating that IP space 1211B has been added to private network 1210A from event log 1209, and may update private network 1210A metadata 1215 with the new IP address space. Resource instances 1216A on private network 1210A may asynchronously call the metadata service 1208 and discover the new IP address space 1211B.

In some embodiments, a resource instance 1216 may include interfaces in two private networks 1210, and thus may logically be considered to be in (or to be shared by) both private networks 1210. As a non-limiting example, a database service may provide a database for private network 1210A's resource instance 1216A. The database may be implemented by one or more resource instances in private network 1210B, and may be accessed by resource instance 1216A in private network 1210A through a shared resource instance 1216B that has interfaces in both private networks 1210. As shown in FIG. 4, shared resource instance 1216B has an interface 1217A in private network 1210A with an IP address in primary IP address space 1211A, and an interface 1217B in private network 1210B with an IP address in private network 1210B's IP address space. Shared resource instance 1216B may asynchronously call the metadata service 1208 in private network 1210A through interface 1217A and discover the new IP address space 1211B. Private network 1210B may then be updated with the new IP address space 1211B through interface 1217B, for example by writing the new IP address space 1211B to one or more route tables used by router(s) 1212B in private network 1210B.

FIG. 5 is a flowchart of a method for propagating a new IP address space in a private network to resource instances in the private network through private network metadata, according to some embodiments. As indicated at 1300, the control plane adds the new IP address space to a virtual private network, for example by adding the new IP address space to one or more route tables in the virtual private network. As indicated at 1302, the control plane writes an entry to an event log via an API; the entry specifies the virtual private network and the new IP address space. As indicated at 1304, a metadata service of the provider network reads entries from the event log via the API and discovers the new IP address space that was added to the virtual private network. As indicated at 1306, the metadata service updates metadata for the virtual private network with the new IP address space. As indicated at 1308, resource instances in the virtual private network call the metadata service and discover the new IP address space.

Figure 6:
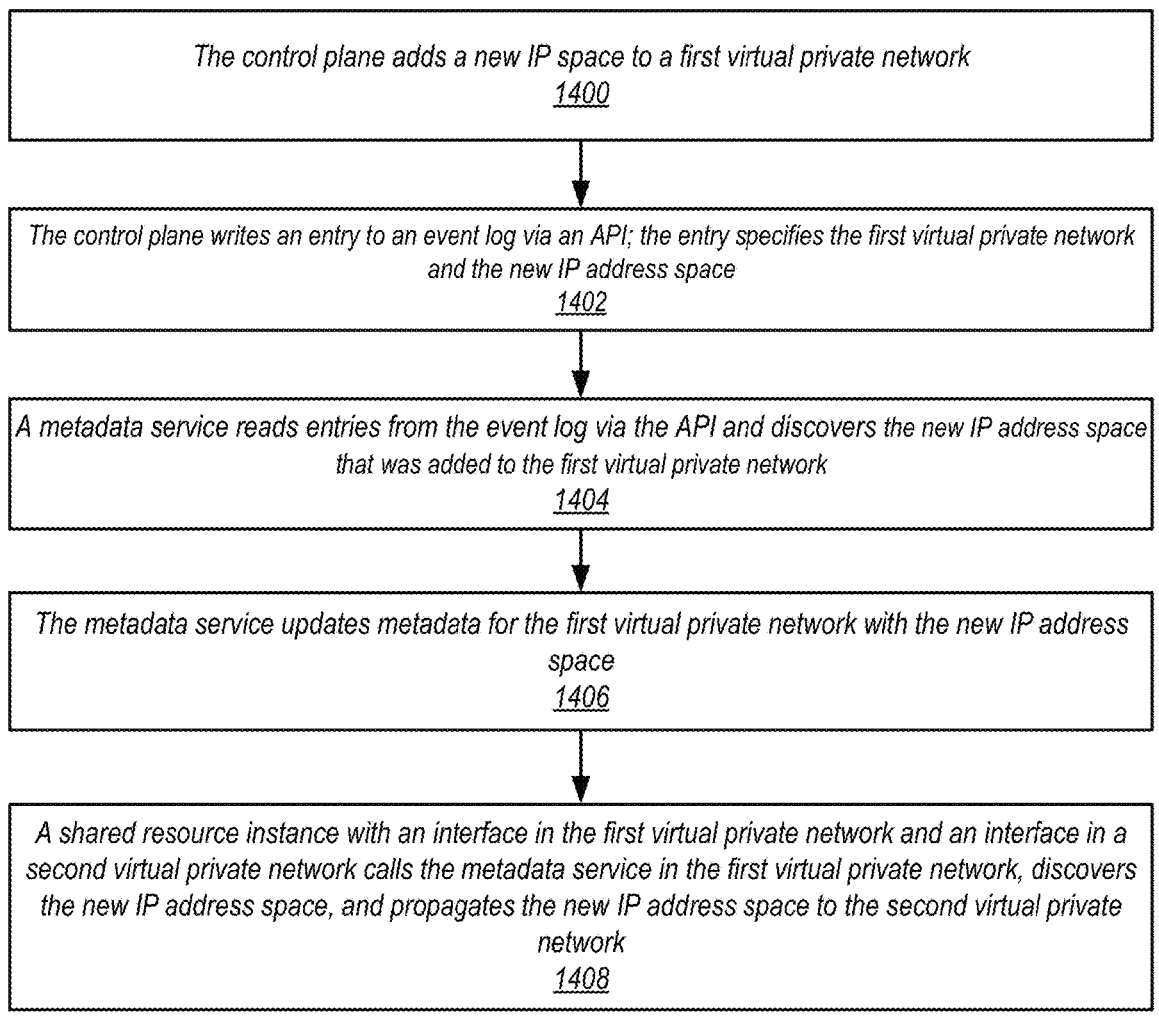
FIG. 6 is a flowchart of a method for propagating a new IP address space in a private network to another private network through a shared resource instance, according to some embodiments.

FIG. 6 is a flowchart of a method for propagating a new IP address space in a private network to another private network through a shared resource instance, according to some embodiments. As indicated at 1400, the control plane adds a new IP address space to a first virtual private network, for example by adding the new IP address space to one or more route tables in the first virtual private network. As indicated at 1402, the control plane writes an entry to an event log of the provider network via an API; the entry specifies the first virtual private network and the new IP address space. As indicated at 1404, a metadata service reads entries from the event log via the API and discovers the new IP address space that was added to the first virtual private network. As indicated at 1406, the metadata service updates metadata for the first virtual private network with the new IP address space. As indicated at 1408, a shared resource instance with an interface in the first virtual private network and an interface in a second virtual private network calls the metadata service in the first virtual private network, discovers the new IP address space, and propagates the new IP address space to the second virtual private network, for example by adding the new IP address space to one or more route tables in the second virtual private network.

Figure 7:
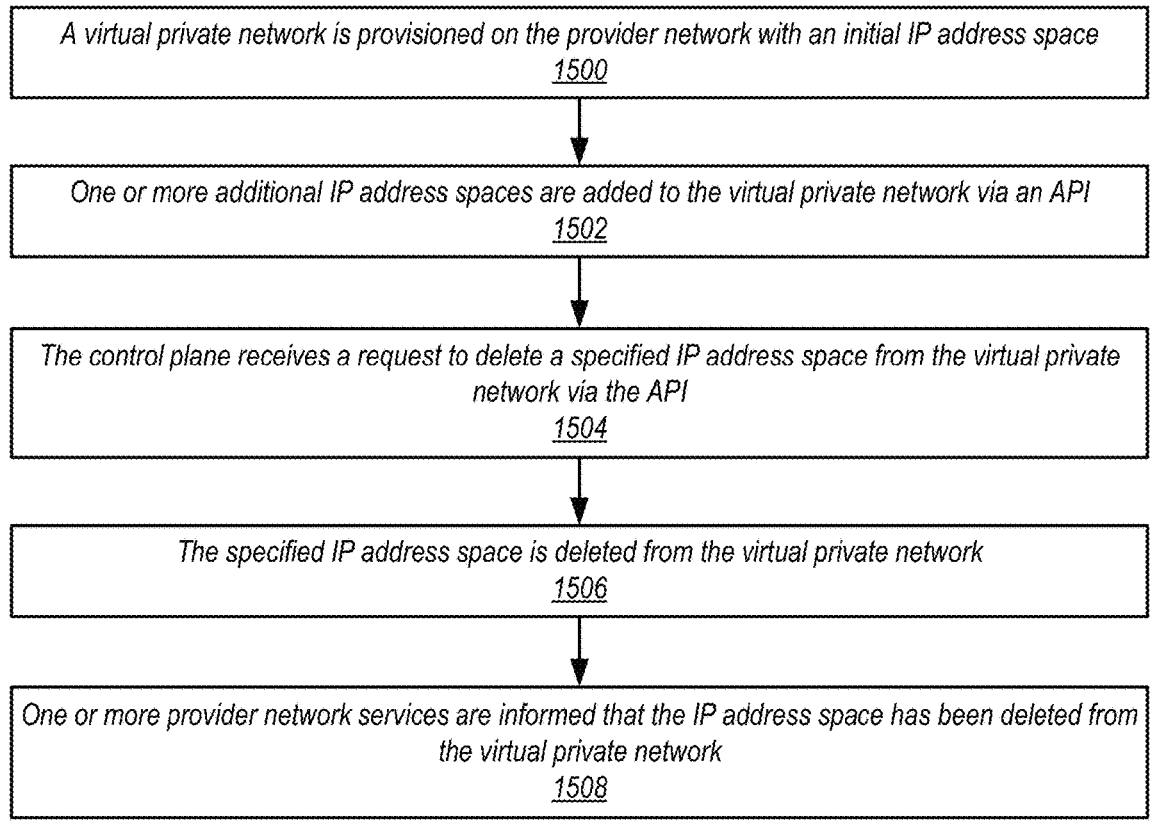
FIG. 7 is a flowchart of a method for deleting IP address spaces from a virtual private network, according to some embodiments.

FIG. 7 is a flowchart of a method for deleting IP address spaces from a virtual private network, according to some embodiments. In some embodiments, an API may be provided that allows customers to view and manage the IP address spaces in their virtual private networks, for example to add new CIDR blocks and delete existing CIDR blocks from their virtual private networks. For example, a customer may view and manage the IP address spaces in their virtual private network from a graphical user interface (GUI) and/or command line interface (CLI) to the API from a console in an external customer network. In some embodiments, customers may not be allowed to delete a virtual private network's initial (also referred to as primary) CIDR block. However, in some embodiments, the initial CIDR block may be deleted as long as there is at least one added CIDR block remaining in the virtual private network. In some embodiments, a CIDR block may not be deleted if there are resource instances with IP addresses within the CIDR block range.

As indicated at 1500, a virtual private network is provisioned on the provider network with an initial IP address space, for example as illustrated in FIG. 1A. As indicated at 1502, one or more additional IP address spaces may be added to the virtual private network via an API, for example as illustrated in FIGS. 1B through 1G. As indicated at 1504, the control plane receives a request to delete a specified IP address space from the virtual private network via the API. As indicated at 1506, the specified IP address space is deleted from the virtual private network. In some embodiments, deleting the IP address space may include one or more of, but is not limited to, removing the IP address space from route table(s) of the virtual private network, and updating a descriptor record for the virtual private network. As indicated at 1508, one or more provider network service may be informed that the IP address space has been deleted from the virtual private network. For example, in some embodiments, the control plane may write events indicating changes to virtual private networks on the provider network to an event log via an API; provider network services that need this information may asynchronously consume the events from the event log via an API to update their information about the virtual private networks and to perform one or more tasks in response to the changes as necessary. In these embodiments, the control plane may write an event to the event log indicating that the IP address space has been deleted from the customer's virtual private network.

FIG. 8A illustrates an example route table for a virtual private network, for example virtual private network 110A as illustrated in FIG. 1A, according to some embodiments. Route table 1600 includes the initial or primary CIDR block of the virtual private network (10.0.0.0/16, in this example). Route table 1600 also includes the IP address space (hij.kl.m.n/yy, in this example) of an external network 192A that is connected to the virtual private network 110A via a direct connection 194. Route table 1600 also includes the IP address space (pqr.st.u.v./zz, in this example) of private network 110B that is connected to the virtual private network 110A via a peering 196 connection. Route table 1600 may also include one or more other routes, for example routes added by the customer.

FIG. 8B illustrates the example route table of FIG. 8A after adding a new IP address space to the virtual private network, according to some embodiments. As shown in FIG. 8B, route table 1600 now includes new CIDR block 11.0.0.0/16 for private network 110A.

FIG. 9 illustrates an example descriptor record for a private network that includes descriptions of the private network's CIDR blocks, according to some embodiments. A descriptor record 1700 for a private network, for example private network 110A as illustrated in FIGS. 1A-1G, may include one or more of, but is not limited to: the private network (PN) name, a private network identifier, the primary or initial CIDR block of the private network, subnet(s) of the private network, information identifying other private networks that are peered with the private network, information about external network(s) that are connected with the private network via direct connections, routing information for the private network, and so on. As shown in FIG. 9, in addition to the primary CIDR block (10.0.0.0/16, in this example), the descriptor record 1700 may be updated to include additional CIDR blocks that are added to the respective private network. For example, descriptor 1700 includes added CIDR blocks 11.0.0.0/16 and 12.0.0.0/16. As shown in FIG. 9, in some embodiments, the descriptor block 1700 may indicate status of each CIDR block (e.g., active, pending, or failed), and may also include a CIDR block identifier for each CIDR block. While not shown, subnet(s) of the CIDR blocks may also be included in descriptor record 1700.

FIG. 10 illustrates an example interface for viewing information about private networks including IP address spaces, according to some embodiments. A customer may establish, provision, and manage private networks 3010A-3010n on provider network 3000 via one or more APIs 3006 of the provider network 3000 accessed through a management console 3082 on the customer's network 3080. For example, the customer may access one or more APIs 3006 to control plane 3004 processes or services via a private network (PN) management interface 3084 displayed on the management console 3082. In some embodiments, the PN management interface 3084 may provide one or more graphical and/or textual interface elements that allow customers to view and manage the IP address spaces of their private networks 3010A-3010n on the provider network 3000. The customer may, for example, use a cursor control device to select various interface elements provided by interface 3084 to, for example, view a list the customer's private network(s) 3010. For each private network 3010, the list may show, but is not limited to, a name, an identifier and a CIDR field. In some embodiments, for private networks 3010 with just an initial CIDR block (e.g., PN 3010A), the list may show the CIDR (10.0.0.0/16, in this example). For private networks 3010 with more than one CIDR block (e.g., PN 3010B), the list may show the number of CIDRs (e.g., three); the customer may hover the cursor over the CIDR field for the private network 3010 to view a pop-up list of the virtual network's CIDR blocks (10.0.0.0/24, 11.0.0.0/24, and 173.21.0.0/24, in this example.)

In some embodiments, the customer may select a particular private network to view more information about the private network's CIDR blocks. In this example, the customer has selected PN 3010B; the interface shows a list of PN 3010B's CIDR blocks. For each CIDR block, one or more of, but not limited to, a description (e.g., provided by the customer when the CIDR block was specified), a status (e.g., active, pending, or failed), and a reason for the status (e.g., "Overlaps with CIDR of a peered PN" for a failed CIDR block) may be displayed.

Note that the interface 3084 may include other user interface elements than those shown.

FIGS. 11A through 11D illustrate an example interface for adding IP address spaces to a virtual private network, according to some embodiments. A customer may establish, provision, and manage a private networks 4010 on provider network 4000 via one or more APIs 4006 of the provider network 4000 accessed through a management console 4082 on the customer's network 4080. For example, the customer may access one or more APIs 4006 to control plane 4004 processes or services via a private network (PN) management interface 4084 displayed on the management console 4082. In some embodiments, the PN management interface 4084 may provide one or more graphical and/or textual interface elements that allow customers to view and manage the IP address spaces of private network 4010 on the provider network 4000. The customer may, for example, use a cursor control device to select various interface elements provided by interface 4084 to, for example, view a list of the CIDR blocks in the customer's private network 4010. In this example, the list shows CIDR blocks 10.0.0.0/24, 11.0.0.0/24, and 12.0.0.0/24. For each CIDR block, one or more of, but not limited to, a description (e.g., provided by the customer when the CIDR block was specified), a status (e.g., active, pending, or failed), and a reason for the status may be displayed. For example, in FIG. 1A, the description of CIDR block 10.0.0.0/24 is "Production", and the status of CIDR block 10.0.0.0/24 is "Active", while the description of CIDR block 12.0.0.0/24 is "Text", and status of CIDR block 12.0.0.0/24 is "Failed", and the reason for the status is "Overlaps with CIDR of a peered PN". In some embodiments, a user interface element may be displayed for at least some of the CIDR blocks (e.g., CIDR block 11.0.0.0/24, in this example) that allows the customer to delete the respective CIDR block via API 4006, if desired.

As shown in FIG. 11A, PN management interface 4084 may include one or more user interface elements that allow the customer to specify a new CIDR block to be added to the respective private network 4010, and a user interface element that allows the customer to request that the new CIDR block be added to the private network 4010. As shown in FIG. 11B, the customer has entered a new CIDR block 13.0.0.0/24 with description "My new CIDR", and selects the "Add CIDR" user interface element to generate a request to the API 4006. As shown in FIG. 11C, the new CIDR block 13.0.0.0/24 and its description may be displayed on the interface 4084, along with a status of "Pending". As shown in FIG. 11D, if the control plane 4004 successfully adds the new CIDR block 13.0.0.0/24 to private network 4010 (e.g., if there are no overlaps with other IP address spaces), then the status of CIDR block 13.0.0.0/24 may change to "Active", and a "Delete" user interface element may be displayed for CIDR block 13.0.0.0/24.

Example Provider Network Environment

This section describes example provider network environments in which embodiments of the methods and apparatus described in reference to FIGS. 1A through 11C may be implemented. However, these example provider network environments are not intended to be limiting.

Figure 12:
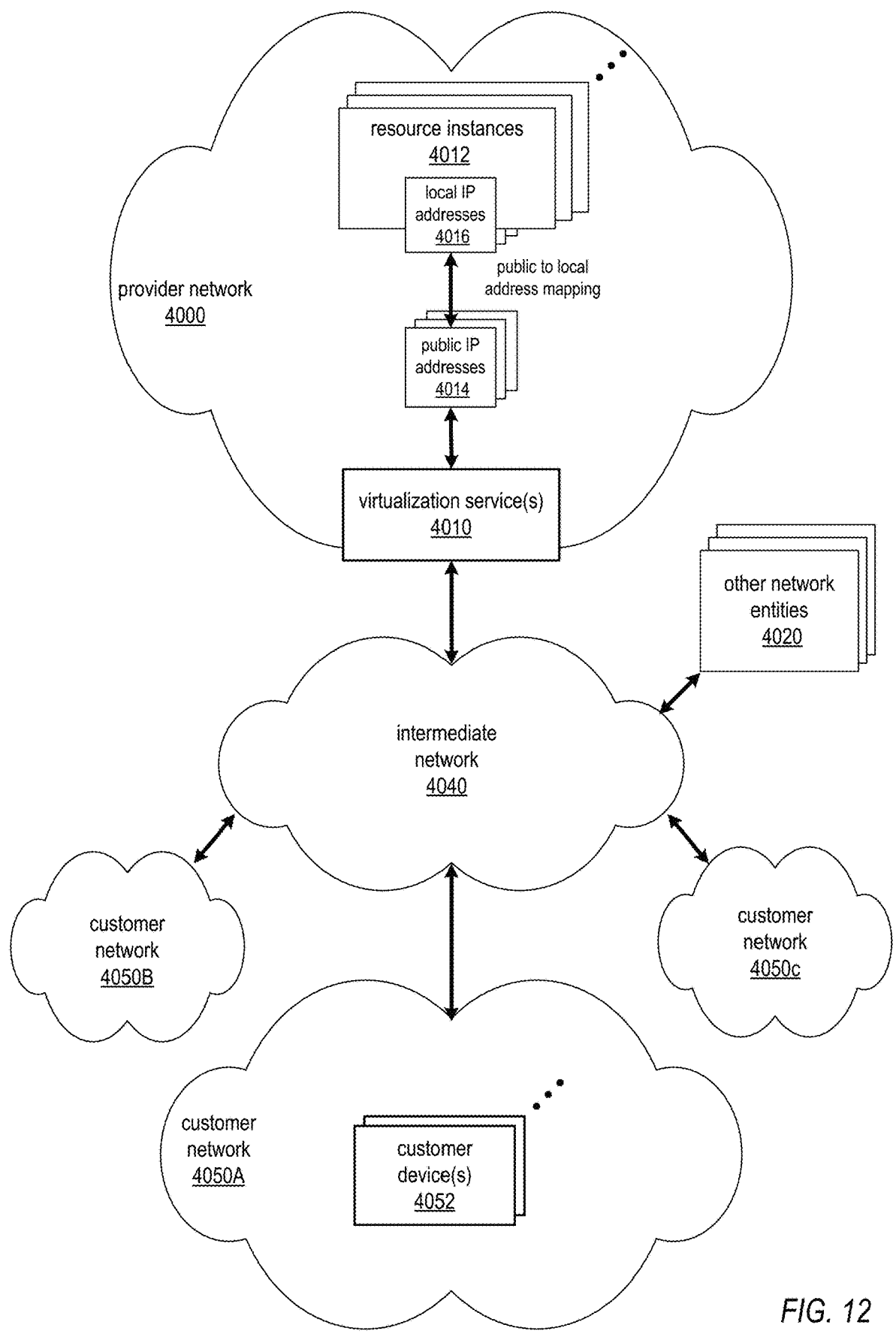
FIG. 12 illustrates an example provider network environment, according to some embodiments.

FIG. 12 illustrates an example provider network environment, according to some embodiments. A provider network 4000 may provide resource virtualization to customers via one or more virtualization services 4010 that allow customers to purchase, rent, or otherwise obtain instances 4012 of virtualized resources, including but not limited to computation and storage resources, implemented on devices within the provider network or networks in one or more data centers. Local IP addresses 4016 may be associated with the resource instances 4012; the local IP addresses are the internal network addresses of the resource instances 4012 on the provider network 4000. In some embodiments, the provider network 4000 may also provide public IP addresses 4014 and/or public IP address ranges (e.g., Internet Protocol version 4 (IPv4) or Internet Protocol version 6 (IPv6) addresses) that customers may obtain from the provider 4000.

Conventionally, the provider network 4000, via the virtualization services 4010, may allow a customer of the service provider (e.g., a customer that operates client network 4050A) to dynamically associate at least some public IP addresses 4014 assigned or allocated to the customer with particular resource instances 4012 assigned to the customer. The provider network 4000 may also allow the customer to remap a public IP address 4014, previously mapped to one virtualized computing resource instance 4012 allocated to the customer, to another virtualized computing resource instance 4012 that is also allocated to the customer. Using the virtualized computing resource instances 4012 and public IP addresses 4014 provided by the service provider, a customer of the service provider such as the operator of customer network 4050A may, for example, implement customer-specific applications and present the customer's applications on an intermediate network 4040, such as the Internet. Other network entities 4020 on the intermediate network 4040 may then generate traffic to a destination public IP address 4014 published by the customer network 4050A; the traffic is routed to the service provider data center, and at the data center is routed, via a network substrate, to the local IP address 4016 of the virtualized computing resource instance 4012 currently mapped to the destination public IP address 4014. Similarly, response traffic from the virtualized computing resource instance 4012 may be routed via the network substrate back onto the intermediate network 4040 to the source entity 4020.

Local IP addresses, as used herein, refer to the internal network addresses of resource instances in a provider network. Local IP addresses are only routable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet routable network addresses that are assigned to resource instances, either by the service provider or by the customer. Traffic routed to a public IP address is translated, for example via 1:1 network address translation (NAT), and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 4000; a customer may then assign their allocated public IP addresses to particular resource instances allocated to the customer. These public IP addresses may be referred to as customer public IP addresses, or simply customer IP addresses. Instead of being assigned by the provider network 4000 to resource instances as in the case of standard IP addresses, customer IP addresses may be assigned to resource instances by the customers, for example via an API provided by the service provider. Unlike standard IP addresses, customer IP Addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 13:
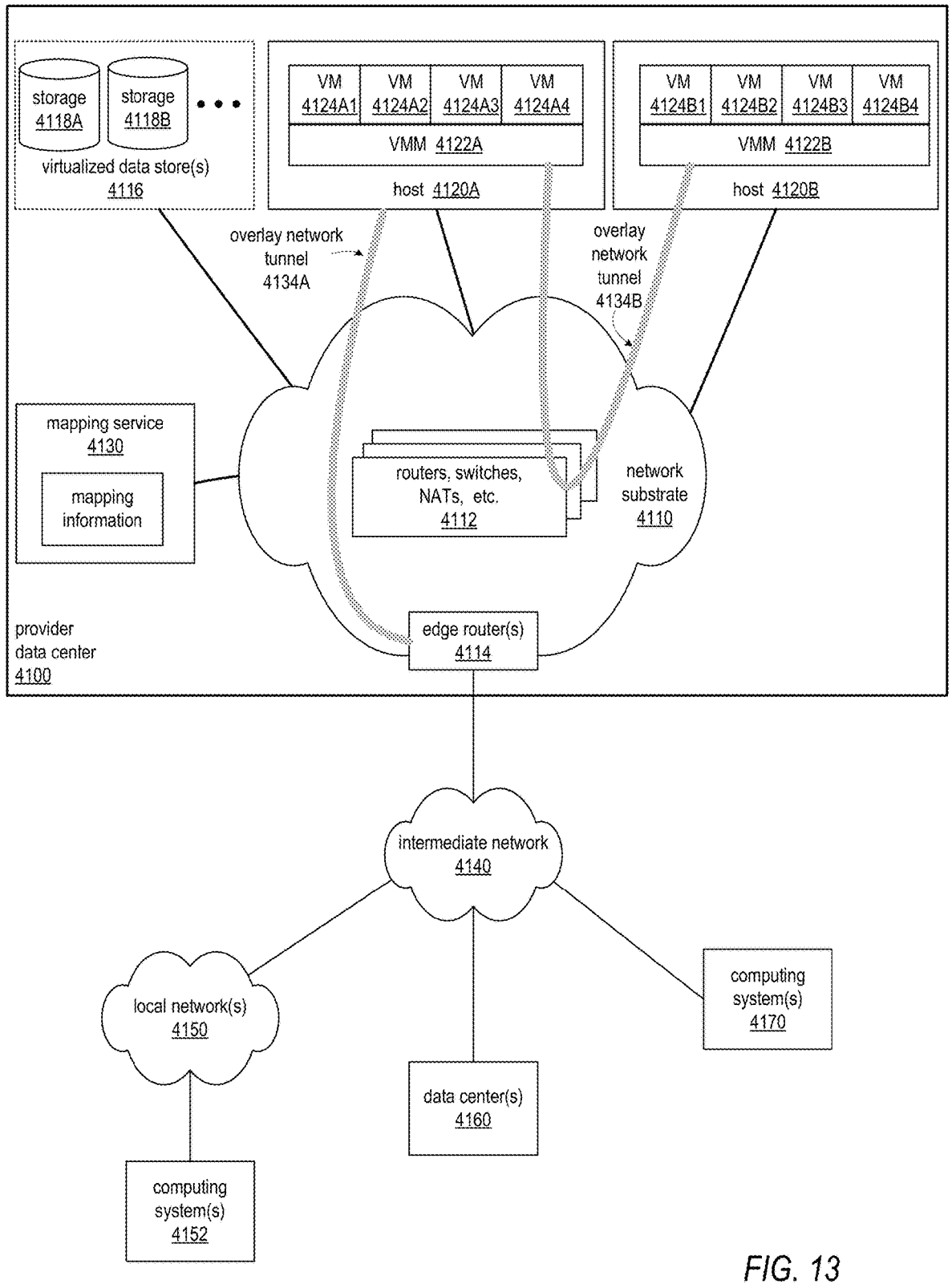
FIG. 13 illustrates an example data center that implements an overlay network on a network substrate using IP tunneling technology, according to some embodiments.

FIG. 13 illustrates an example data center that implements an overlay network on a network substrate using IP tunneling technology, according to some embodiments. A provider data center 4100 may include a network substrate that includes networking devices 4112 such as routers, switches, network address translators (NATs), and so on. Some embodiments may employ an Internet Protocol (IP) tunneling technology to provide an overlay network via which encapsulated packets may be passed through network substrate 4110 using tunnels. The IP tunneling technology may provide a mapping and encapsulating system for creating an overlay network on a network (e.g., a local network in data center 4100 of FIG. 13) and may provide a separate namespace for the overlay layer (the public IP addresses) and the network substrate 4110 layer (the local IP addresses). Packets in the overlay layer may be checked against a mapping directory (e.g., provided by mapping service 4130) to determine what their tunnel substrate target (local IP address) should be. The IP tunneling technology provides a virtual network topology (the overlay network); the interfaces (e.g., service APIs) that are presented to customers are attached to the overlay network so that when a customer provides an IP address to which the customer wants to send packets, the IP address is run in virtual space by communicating with a mapping service (e.g., mapping service 4130) that knows where the IP overlay addresses are.

In some embodiments, the IP tunneling technology may map IP overlay addresses (public IP addresses) to substrate IP addresses (local IP addresses), encapsulate the packets in a tunnel between the two namespaces, and deliver the packet to the correct endpoint via the tunnel, where the encapsulation is stripped from the packet. In FIG. 13, an example overlay network tunnel 4134A from a virtual machine (VM) 4124A on host 4120A to a device on the intermediate network 4150 and an example overlay network tunnel 4134B between a VM 4124B on host 4120B and a VM 4124C on host 4120C are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (local IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the local IP addresses.

Referring to FIG. 13, at least some networks in which embodiments may be implemented may include hardware virtualization technology that enables multiple operating systems to run concurrently on a host computer (e.g., hosts 4120A and 4120B of FIG. 13), i.e. as virtual machines (VMs) 4124 on the hosts 4120. The VMs 4124 may, for example, be executed in slots on the hosts 4120 that are rented or leased to customers of a network provider. A hypervisor, or virtual machine monitor (VMM) 4122, on a host 4120 presents the VMs 4124 on the host with a virtual platform and monitors the execution of the VMs 4124. Each VM 4124 may be provided with one or more local IP addresses; the VMM 4122 on a host 4120 may be aware of the local IP addresses of the VMs 4124 on the host. A mapping service 4130 may be aware of all network IP prefixes and the IP addresses of routers or other devices serving IP addresses on the local network. This includes the IP addresses of the VMMs 4122 serving multiple VMs 4124. The mapping service 4130 may be centralized, for example on a server system, or alternatively may be distributed among two or more server systems or other devices on the network. A network may, for example, use the mapping service technology and IP tunneling technology to, for example, route data packets between VMs 4124 on different hosts 4120 within the data center 4100 network; note that an interior gateway protocol (IGP) may be used to exchange routing information within such a local network.

In addition, a network such as the provider data center 4100 network (which is sometimes referred to as an autonomous system (AS)) may use the mapping service technology, IP tunneling technology, and routing service technology to route packets from the VMs 4124 to Internet destinations, and from Internet sources to the VMs 4124. Note that an external gateway protocol (EGP) or border gateway protocol (BGP) is typically used for Internet routing between sources and destinations on the Internet. FIG. 13 shows an example provider data center 4100 implementing a network that provides resource virtualization technology and that provides full Internet access via edge router(s) 4114 that connect to Internet transit providers, according to some embodiments. The provider data center 4100 may, for example, provide customers the ability to implement virtual computing systems (VMs 4124) via a hardware virtualization service and the ability to implement virtualized data stores 4116 on storage resources 4118 via a storage virtualization service.

The data center 4100 network may implement IP tunneling technology, mapping service technology, and a routing service technology to route traffic to and from virtualized resources, for example to route packets from the VMs 4124 on hosts 4120 in data center 4100 to Internet destinations, and from Internet sources to the VMs 4124. Internet sources and destinations may, for example, include computing systems 4170 connected to the intermediate network 4140 and computing systems 4152 connected to local networks 4150 that connect to the intermediate network 4140 (e.g., via edge router(s) 4114 that connect the network 4150 to Internet transit providers). The provider data center 4100 network may also route packets between resources in data center 4100, for example from a VM 4124 on a host 4120 in data center 4100 to other VMs 4124 on the same host or on other hosts 4120 in data center 4100.

A service provider that provides data center 4100 may also provide additional data center(s) 4160 that include hardware virtualization technology similar to data center 4100 and that may also be connected to intermediate network 4140. Packets may be forwarded from data center 4100 to other data centers 4160, for example from a VM 4124 on a host 4120 in data center 4100 to another VM on another host in another, similar data center 4160, and vice versa.

While the above describes hardware virtualization technology that enables multiple operating systems to run concurrently on host computers as virtual machines (VMs) on the hosts, where the VMs may be instantiated on slots on hosts that are rented or leased to customers of the network provider, the hardware virtualization technology may also be used to provide other computing resources, for example storage resources 4118, as virtualized resources to customers of a network provider in a similar manner.

Figure 14:
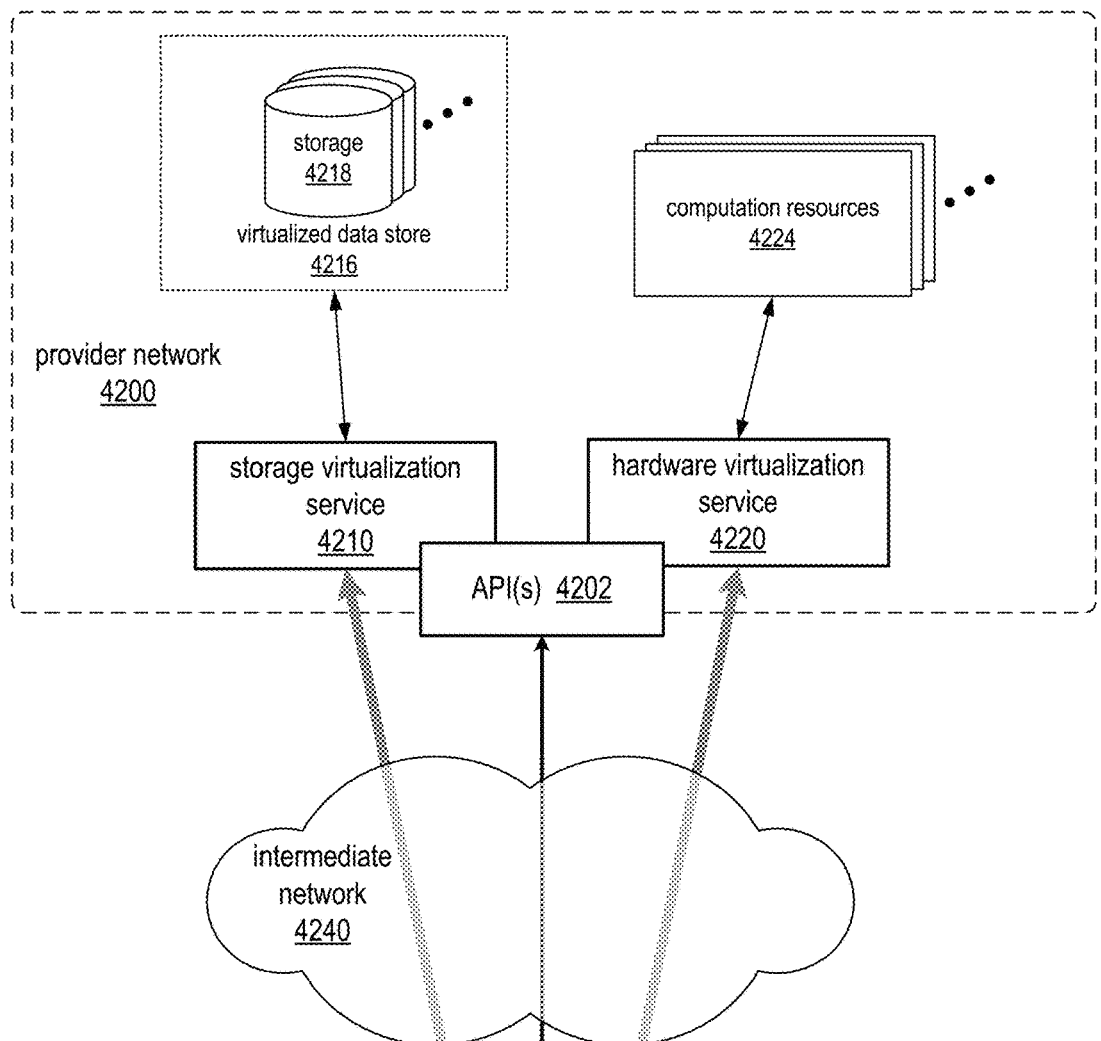
FIG. 14 is a block diagram of an example provider network that provides a storage virtualization service and a hardware virtualization service to customers, according to some embodiments.
Figure 14:
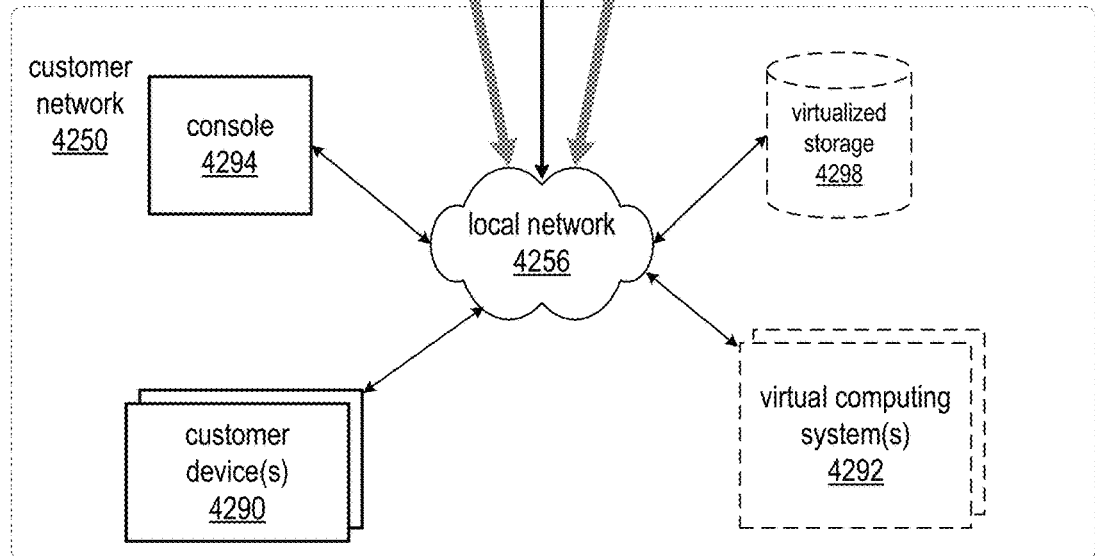

FIG. 14 is a block diagram of an example provider network that provides a storage virtualization service and a hardware virtualization service to customers, according to some embodiments. Hardware virtualization service 4220 provides multiple computation resources 4224 (e.g., VMs)

to customers. The computation resources 4224 may, for example, be rented or leased to customers of the provider network 4200 (e.g., to a customer that implements customer network 4250). Each computation resource 4224 may be provided with one or more local IP addresses. Provider network 4200 may be configured to route packets from the local IP addresses of the computation resources 4224 to public Internet destinations, and from public Internet sources to the local IP addresses of computation resources 4224.

Provider network 4200 may provide a customer network 4250, for example coupled to intermediate network 4240 via local network 4256, the ability to implement virtual computing systems 4292 via hardware virtualization service 4220 coupled to intermediate network 4240 and to provider network 4200. In some embodiments, hardware virtualization service 4220 may provide one or more APIs 4202, for example a web services interface, via which a customer network 4250 may access functionality provided by the hardware virtualization service 4220, for example via a console 4294. In some embodiments, at the provider network 4200, each virtual computing system 4292 at customer network 4250 may correspond to a computation resource 4224 that is leased, rented, or otherwise provided to customer network 4250.

From an instance of a virtual computing system 4292 and/or another customer device 4290 or console 4294, the customer may access the functionality of storage virtualization service 4210, for example via one or more APIs 4202, to access data from and store data to a virtual data store 4216 provided by the provider network 4200. In some embodiments, a virtualized data store gateway (not shown) may be provided at the customer network 4250 that may locally cache at least some data, for example frequently accessed or critical data, and that may communicate with virtualized data store service 4210 via one or more communications channels to upload new or modified data from a local cache so that the primary store of data (virtualized data store 4216) is maintained. In some embodiments, a user, via a virtual computing system 4292 and/or on another customer device 4290, may mount and access virtual data store 4216 volumes, which appear to the user as local virtualized storage 4298.

While not shown in FIG. 14, the virtualization service(s) may also be accessed from resource instances within the provider network 4200 via API(s) 4202. For example, a customer, appliance service provider, or other entity may access a virtualization service from within a respective virtual network on the provider network 4200 via an API 4202 to request allocation of one or more resource instances within the virtual network or within another virtual network.

Figure 15:
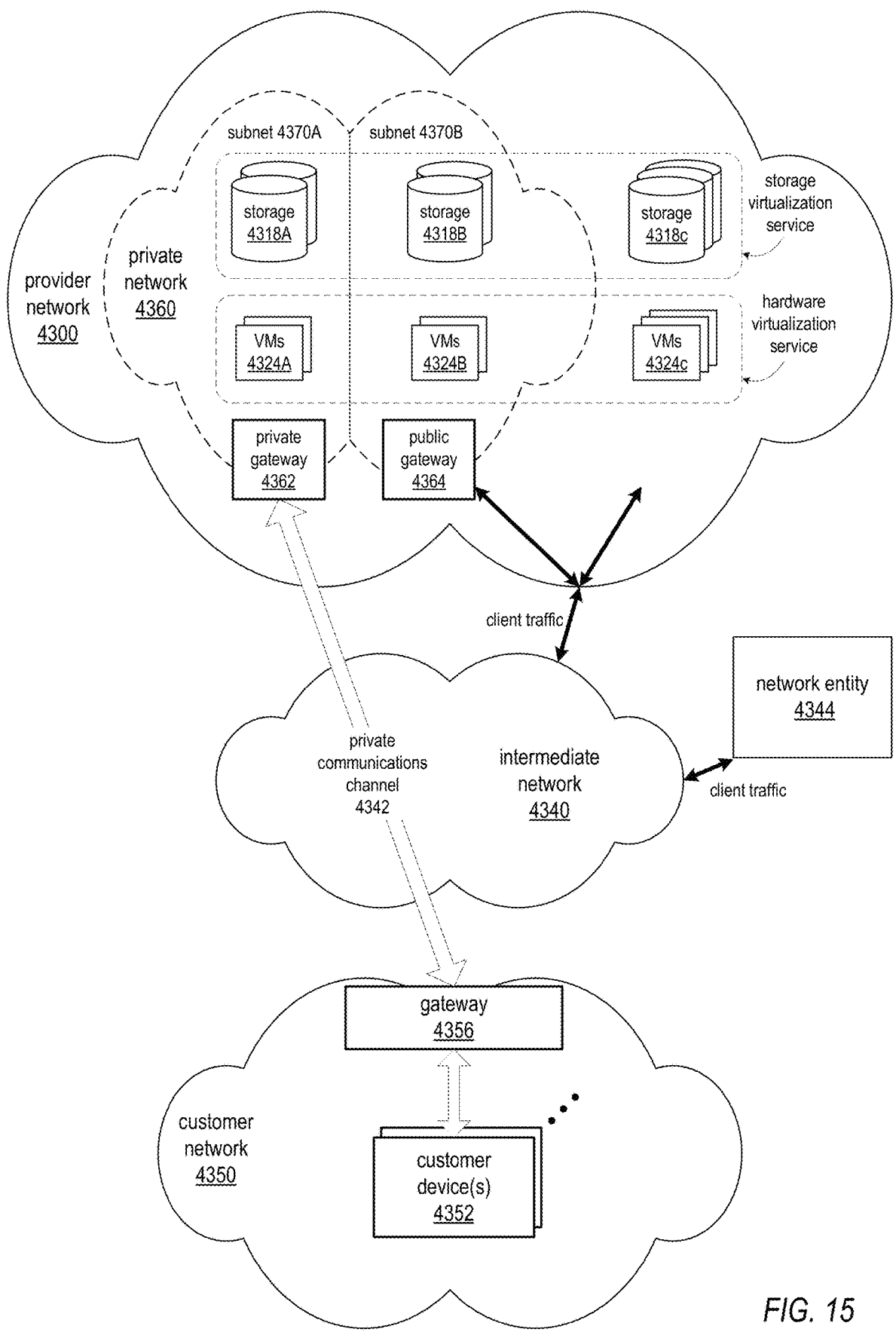
FIG. 15 illustrates an example provider network that provides virtual private networks to customers, according to some embodiments.

FIG. 15 illustrates an example provider network that provides virtual networks on the provider network to at least some customers, according to some embodiments. A customer's virtual network 4360 on a provider network 4300, for example, enables a customer to connect their existing infrastructure (e.g., devices 4352) on customer network 4350 to a set of logically isolated resource instances (e.g., VMs 4324A and 4324B and storage 4318A and 4318B), and to extend management capabilities such as security services, firewalls, and intrusion detection systems to include their resource instances.

A customer's virtual network 4360 may be connected to a customer network 4350 via a private communications channel 4342. A private communications channel 4342 may, for example, be a tunnel implemented according to a network tunneling technology or some other technology over an intermediate network 4340. The intermediate network may, for example, be a shared network or a public network such as the Internet. Alternatively, a private communications channel 4342 may be implemented over a direct, dedicated connection between virtual network 4360 and customer network 4350.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In some embodiments, either a shared network or a public network may serve as an intermediate network between a provider network and a customer network.

To establish a virtual network 4360 for a customer on provider network 4300, one or more resource instances (e.g., VMs 4324A and 4324B and storage 4318A and 4318B) may be allocated to the virtual network 4360. Note that other resource instances (e.g., storage 4318C and VMs 4324C) may remain available on the provider network 4300 for other customer usage. A range of public IP addresses may also be allocated to the virtual network 4360. In addition, one or more networking devices (routers, switches, etc.) of the provider network 4300 may be allocated to the virtual network 4360. A private communications channel 4342 may be established between a private gateway 4362 at virtual network 4360 and a gateway 4356 at customer network 4350.

In some embodiments, in addition to, or instead of, a private gateway 4362, virtual network 4360 may include a public gateway 4364 that enables resources within virtual network 4360 to communicate directly with entities (e.g., network entity 4344) via intermediate network 4340, and vice versa, instead of or in addition to via private communications channel 4342.

Virtual network 4360 may be, but is not necessarily, subdivided into two or more subnetworks, or subnets, 4370. For example, in implementations that include both a private gateway 4362 and a public gateway 4364, a virtual network 4360 may be subdivided into a subnet 4370A that includes resources (VMs 4324A and storage 4318A, in this example) reachable through private gateway 4362, and a subnet 4370B that includes resources (VMs 4324B and storage 4318B, in this example) reachable through public gateway 4364.

The customer may assign particular customer public IP addresses to particular resource instances in virtual network 4360. A network entity 4344 on intermediate network 4340 may then send traffic to a public IP address published by the customer; the traffic is routed, by the provider network 4300, to the associated resource instance. Return traffic from the resource instance is routed, by the provider network 4300, back to the network entity 4344 over intermediate network 4340. Note that routing traffic between a resource instance and a network entity 4344 may require network address translation to translate between the public IP address and the local IP address of the resource instance.

Some embodiments may allow a customer to remap public IP addresses in a customer's virtual network 4360 as illustrated in FIG. 15 to devices on the customer's external network 4350. When a packet is received (e.g., from network entity 4344), the network 4300 may determine that the destination IP address indicated by the packet has been remapped to an endpoint on external network 4350 and handle routing of the packet to the respective endpoint, either via private communications channel 4342 or via the intermediate network 4340. Response traffic may be routed from the endpoint to the network entity 4344 through the provider network 4300, or alternatively may be directly routed to the network entity 4344 by the customer network 4350. From the perspective of the network entity 4344, it appears as if the network entity 4344 is communicating with the public IP address of the customer on the provider network 4300. However, the network entity 4344 has actually communicated with the endpoint on customer network 4350.

While FIG. 15 shows network entity 4344 on intermediate network 4340 and external to provider network 4300, a network entity may be an entity on provider network 4300. For example, one of the resource instances provided by provider network 4300 may be a network entity that sends traffic to a public IP address published by the customer.

Figure 16:
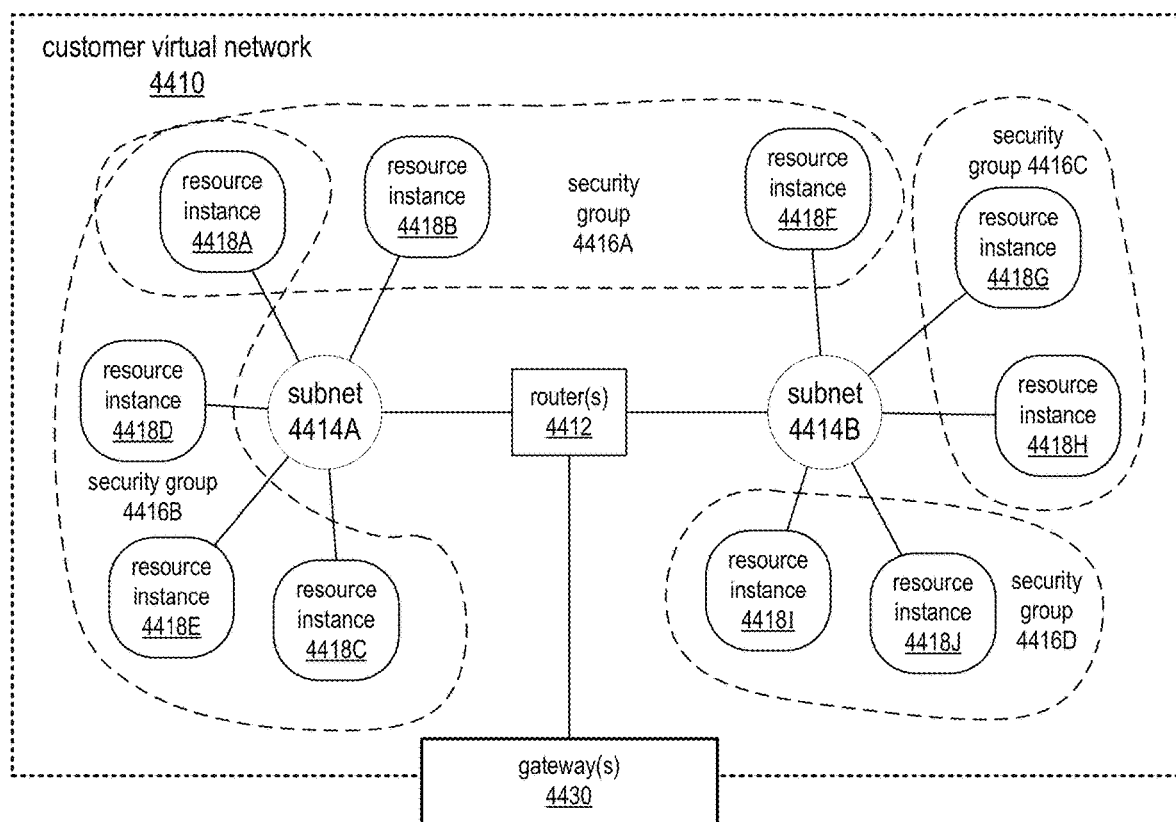
FIG. 16 illustrates subnets and security groups in an example virtual private network on a provider network, according to some embodiments.

FIG. 16 illustrates subnets and security groups in an example virtual network on a provider network, according to some embodiments. In some embodiments, a provider network such as provider network 4300 in FIG. 13 may allow the customer to establish and manage virtual security groups 4416 within the customer's virtual network 4410, within or across subnets 4414. A security group 4416 is a logical grouping of resource instances 4418 and acts as a virtual firewall that controls the traffic allowed to reach one or more resource instances 4418 within the security group 4416 according to security group rules. The customer may establish one or more security groups 4416 within the virtual network 4410, and may associate each resource instance 4418 in the virtual network 4410 with one or more of the security groups 4416. In some embodiments, the customer may establish and/or modify rules for each security group 4416 that control the inbound traffic allowed to reach the resource instances 4418 associated with the security group 4416.

In the example virtual network 4410 shown in FIG. 16, the virtual network 4410 is subdivided into two subnets 4414A and 4414B. Access to the virtual network 4410 is controlled by gateway(s) 4430. Each subnet 4414 may include at least one router 4412 that acts to route traffic to (and from) resource instances 4418 on the respective subnet 4414. In some embodiments, network access control lists (ACLs) may be used to control access to the subnets 4414 at router(s) 4412. In the example shown in FIG. 16, resource instances 4418A through 4418E are on subnet 4414A, and resource instances 4418F through 4418J are on subnet 4414B. The customer has established four security groups 4416A through 4416D. As shown in FIG. 16, a security group may extend across subnets 4414, as does security group 4416A that includes resource instances 4418A and 4418B on subnet 4414A and resource instance 4418F on subnet 4414B. In addition, a resource instance 4418 may be included in two or more security groups 4416, as is resource instance 4418A which is included in security group 4416A and 4416B.

Illustrative System

Figure 17:
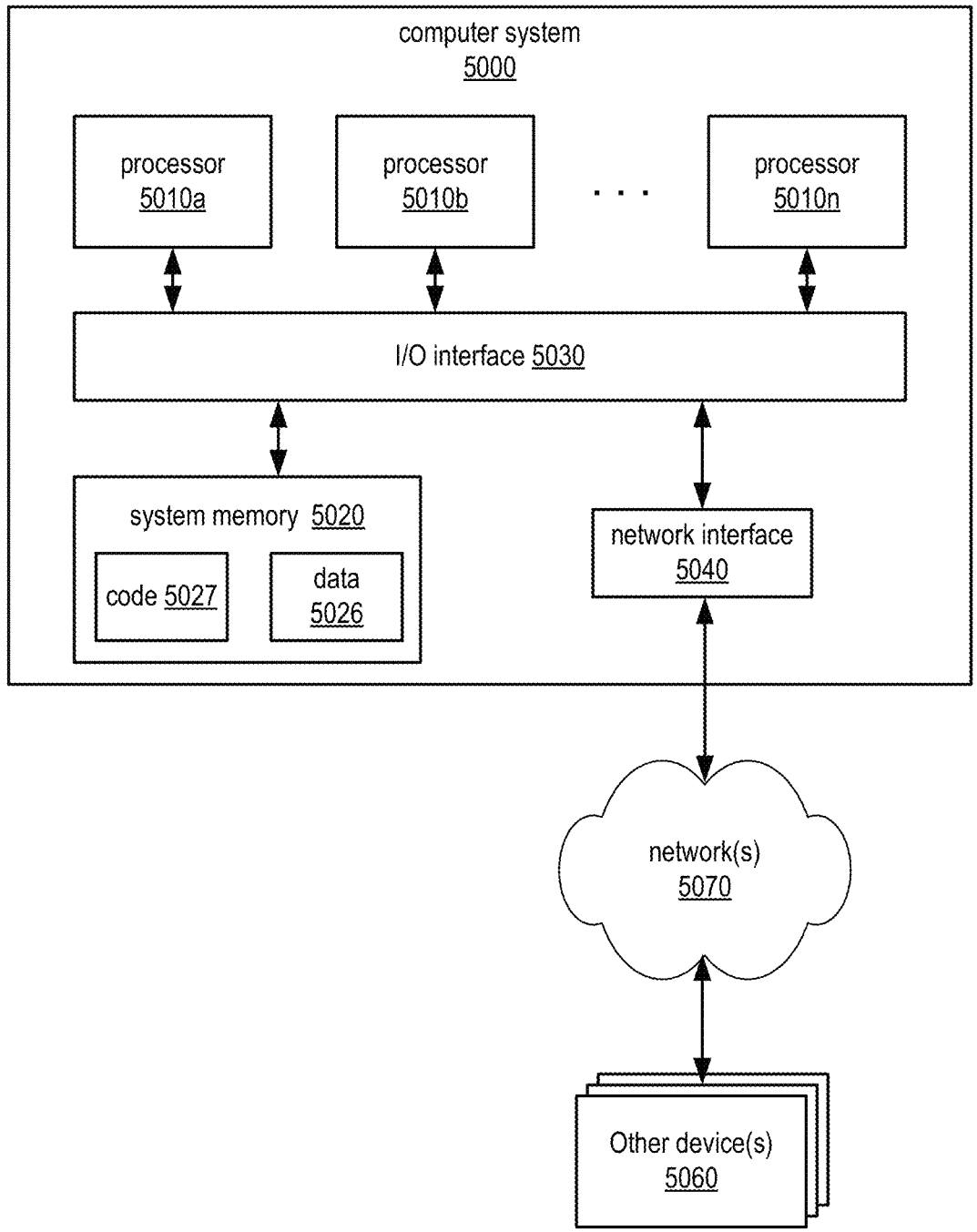
FIG. 17 is a block diagram illustrating an example computer system that may be used in some embodiments.

In some embodiments, a system that implements a portion or all of the methods and apparatus for resizing virtual networks in provider network environments as described herein may include a general-purpose computer system that includes or is configured to access one or more computer-accessible media, such as computer system 5000 illustrated in FIG. 17. In the illustrated embodiment, computer system 5000 includes one or more processors 5010 coupled to a system memory 5020 via an input/output (I/O) interface 5030. Computer system 5000 further includes a network interface 5040 coupled to I/O interface 5030. While FIG. 17 shows computer system 5000 as a single computing device, in various embodiments a computer system 5000 may include one computing device or any number of computing devices configured to work together as a single computer system 5000.

In various embodiments, computer system 5000 may be a uniprocessor system including one processor 5010, or a multiprocessor system including several processors 5010 (e.g., two, four, eight, or another suitable number). Processors 5010 may be any suitable processors capable of executing instructions. For example, in various embodiments, processors 5010 may be general-purpose or embedded processors implementing any of a variety of instruction set architectures (ISAs), such as the x86, PowerPC, SPARC, or MIPS ISAs, or any other suitable ISA. In multiprocessor systems, each of processors 5010 may commonly, but not necessarily, implement the same ISA.

System memory 5020 may be configured to store instructions and data accessible by processor(s) 5010. In various embodiments, system memory 5020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 5020 as code 5025 and data 5026.

In one embodiment, I/O interface 5030 may be configured to coordinate I/O traffic between processor 5010, system memory 5020, and any peripheral devices in the device, including network interface 5040 or other peripheral interfaces. In some embodiments, I/O interface 5030 may perform any necessary protocol, timing or other data transformations to convert data signals from one component (e.g., system memory 5020) into a format suitable for use by another component (e.g., processor 5010). In some embodiments, I/O interface 5030 may include support for devices attached through various types of peripheral buses, such as a variant of the Peripheral Component Interconnect (PCI) bus standard or the Universal Serial Bus (USB) standard, for example. In some embodiments, the function of I/O interface 5030 may be split into two or more separate components, such as a north bridge and a south bridge, for example. Also, in some embodiments some or all of the functionality of I/O interface 5030, such as an interface to system memory 5020, may be incorporated directly into processor 5010.

Network interface 5040 may be configured to allow data to be exchanged between computer system 5000 and other devices 5060 attached to a network or networks 5050, such as other computer systems or devices as illustrated in FIGS. 1A through 16, for example. In various embodiments, network interface 5040 may support communication via any suitable wired or wireless general data networks, such as types of Ethernet network, for example. Additionally, network interface 5040 may support communication via telecommunications/telephony networks such as analog voice networks or digital fiber communications networks, via storage area networks such as Fibre Channel SANs, or via any other suitable type of network and/or protocol.

In some embodiments, system memory 5020 may be one embodiment of a computer-accessible medium configured to store program instructions and data as described above for FIGS. 1A through 11C for providing customer hosted endpoints in provider network environments. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 5000 via I/O interface 5030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 5000 as system memory 5020 or another type of memory. Further, a computer-accessible medium may include transmission media or signals such as electrical, electromagnetic, or digital signals, conveyed via a communication medium such as a network and/or a wireless link, such as may be implemented via network interface 5040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising;
a virtual private network on a provider network; and
a control plane implemented by one or more devices on the provider network configured to:
  receive a request that specifies a new IP address range to be added to the virtual private network on the provider network;
  verify that the new IP address range does not overlap with one or more other IP address ranges associated with the virtual private network; and
  configure the new IP address range in the virtual private network.

2. The system as recited in claim 1, wherein to configure the new IP address range in the virtual private network, the control plane is further configured to:
add the new IP address range to one or more route tables associated with the virtual private network.

3. The system as recited in claim 1, wherein the control plane is further configured to:
obtain from a descriptor record located in a control plane data store the one or more other IP address ranges associated with the virtual private network.

4. The system as recited in claim 1, wherein the one or more other IP address ranges associated with the virtual private network comprise one or more of:
an existing IP address range of the virtual private network;
an IP address range of an external network connected to the virtual private network;
an IP address range associated with routes in one or more routing tables associated with the virtual private network; or
an IP address range of another virtual private network connected to the virtual private network through a virtual peering connection.

5. A method, comprising:
performing, by a control plane on a provider network:
  receiving a request that specifies a new IP address range to be added to a virtual private network on the provider network;
  verifying that the new IP address range does not overlap with one or more other IP address ranges associated with the virtual private network; and
  configuring the new IP address range in the virtual private network.

6. The method of claim 5, wherein configuring the new IP address range in the virtual private network further comprises:
adding the new IP address range to one or more route tables associated with the virtual private network.

7. The method as recited in claim 5, wherein the one or more other IP address ranges associated with the virtual private network comprise one or more of:
an existing IP address range of the virtual private network;
an IP address range of an external network connected to the virtual private network;
an IP address range associated with routes in one or more routing tables associated with the virtual private network; or
an IP address range of another virtual private network connected to the virtual private network through a virtual peering connection.

8. The method as recited in claim 5, further comprising:
obtaining from a descriptor record located in a control plane data store the one or more other IP address ranges associated with the virtual private network.

9. The method as recited in claim 5, wherein configuring the new IP address range in the virtual private network further comprises:
adding the new IP address range to a descriptor record.

10. The method as recited in claim 5, wherein configuring the new IP address range in the virtual private network further comprises:
updating an event log regarding creation of the new IP address range.

11. The method as recited in claim 5, further comprising:
disallowing addition of other IPv4 private address ranges if an initial IP address range of the virtual private network is an IPv4 address range.

12. The method as recited in claim 5, further comprising:
disallowing an overlap with reserved IP ranges used by processes or services of the provider network.

13. The method as recited in claim 5, further comprising:
informing one or more provider network services of the new IP address range such that the one or more provider network services perform workflows to process the new IP address range.

14. The method as recited in claim 13, wherein the one or more provider network services comprise a metadata service that exposes an interface to resource instances executing as virtual machines on the virtual private network, the interface allowing an executing resource instance to obtain metadata about the virtual private network.

15. The method as recited in claim 14, further comprising:
causing the executing resource instance of the virtual private network to call the metadata service to discover the new IP address range.

16. The method as recited in claim 5, further comprising:
outputting an indication that the new IP address range cannot be added to the virtual private network in response to determining that the new IP address range overlaps with at least one of the one or more other IP address ranges associated with the virtual private network.

17. One or more non-transitory computer-readable storage media storing program instructions that when executed on or across one or more processors of a control plane of a provider network, cause the one or more processors to:
receive a request that specifies a new IP address range to be added to a virtual private network on the provider network;
verify that the new IP address range does not overlap with one or more other IP address ranges associated with the virtual private network; and
configure the new IP address range in the virtual private network.

18. The one or more non-transitory computer-readable storage media as recited in claim 17, wherein the program instructions further cause the one or more processors of the control plane of the provider network to:
disallow an overlap with reserved IP ranges used by processes or services of the provider network.

19. The one or more non-transitory computer-readable storage media as recited in claim 17, wherein to configure the new IP address range in the virtual private network, the program instructions further cause the one or more processors of the control plane of the provider network to:
add the new IP address range to one or more route tables associated with the virtual private network.

20. The one or more non-transitory computer-readable storage media as recited in claim 17, wherein the one or more other IP address ranges associated with the virtual private network comprise one or more of:
an existing IP address range of the virtual private network;
an IP address range of an external network connected to the virtual private network;
an IP address range associated with routes in one or more routing tables associated with the virtual private network; or
an IP address range of another virtual private network connected to the virtual private network through a virtual peering connection.

* * * * *